(12) United States Patent
Haase et al.

(10) Patent No.: US 11,880,072 B2
(45) Date of Patent: Jan. 23, 2024

(54) OPTICAL FERRULES WITH WAVEGUIDE INACCESSIBLE SPACE

(71) Applicant: 3M INNOVATIVE PROPERTIES COMPANY, St. Paul, MN (US)

(72) Inventors: Michael A. Haase, St. Paul, MN (US); Terry L. Smith, Roseville, MN (US); Bing Hao, Woodbury, MN (US); Changbao Ma, Austin, TX (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 0 days.

(21) Appl. No.: 17/693,991

(22) Filed: Mar. 14, 2022

(65) Prior Publication Data
US 2022/0196925 A1    Jun. 23, 2022

Related U.S. Application Data

(63) Continuation of application No. 15/763,526, filed as application No. PCT/US2016/055115 on Oct. 3, 2016, now Pat. No. 11,307,362.
(Continued)

(51) Int. Cl.
*G02B 6/36* (2006.01)
*G02B 6/38* (2006.01)

(52) U.S. Cl.
CPC .......... *G02B 6/3861* (2013.01); *G02B 6/382* (2013.01); *G02B 6/3839* (2013.01);
(Continued)

(58) Field of Classification Search
CPC .. G02B 6/3861; G02B 6/3885; G02B 6/3853; G02B 6/3839; G02B 6/382; G02B 6/3838; G02B 6/3652; G02B 6/3834; G02B 6/387
(Continued)

(56) References Cited

U.S. PATENT DOCUMENTS

| | | |
|---|---|---|
| 4,718,744 A | 1/1988 | Manning |
| 5,257,336 A | 10/1993 | Dautartas |

(Continued)

FOREIGN PATENT DOCUMENTS

| | | |
|---|---|---|
| JP | 07120642 | 5/1995 |
| JP | H11-211933 | 8/1999 |

(Continued)

OTHER PUBLICATIONS

International Search report for PCT International Application No. PCT/US2016/055115 dated Dec. 6, 2016, 4 pages.

*Primary Examiner* — Kaveh C Kianni
*Assistant Examiner* — Hung Q Lam
(74) *Attorney, Agent, or Firm* — Clifton F. Richardson

(57) ABSTRACT

An optical ferrule includes at least one light affecting element configured to affect one or more characteristics of light from an optical waveguide as the light propagates in the optical ferrule, the light affecting element having an input surface. At least one receiving element receives and secures the optical waveguide to the ferrule so that an output surface of the waveguide is optically coupled to the input surface of the light affecting element. A waveguide stop limits movement of the waveguide toward the input surface of the light affecting element when the optical waveguide is installed in the receiving element. A space between the output surface of the optical waveguide and the input surface of the light affecting element is inaccessible to the optical waveguide when the optical waveguide is installed in the receiving element.

12 Claims, 16 Drawing Sheets

Related U.S. Application Data

(60) Provisional application No. 62/240,002, filed on Oct. 12, 2015.

(52) U.S. Cl.
CPC ......... *G02B 6/3853* (2013.01); *G02B 6/3885* (2013.01); *G02B 6/3652* (2013.01); *G02B 6/3838* (2013.01)

(58) Field of Classification Search
USPC .......... 385/60, 61, 65, 74, 78, 79, 80, 83
See application file for complete search history.

(56) References Cited

U.S. PATENT DOCUMENTS

| | | | |
|---|---|---|---|
| 5,706,371 A | 1/1998 | Pan | |
| 6,168,319 B1 * | 1/2001 | Francis | G02B 6/32 |
| | | | 385/60 |
| 6,257,772 B1 | 7/2001 | Nakanishi et al. | |
| 6,263,137 B1 | 7/2001 | Yoneyama et al. | |
| 6,332,719 B1 | 12/2001 | Nishikawa et al. | |
| 7,473,038 B2 | 1/2009 | Fujiwara | |
| 7,534,052 B2 | 5/2009 | Fujiwara | |
| 7,726,885 B2 | 6/2010 | Nishimura | |
| 8,165,432 B2 | 4/2012 | Ohta | |
| 8,939,657 B2 | 1/2015 | Hung | |
| 2002/0048436 A1 | 4/2002 | Nishikawa et al. | |
| 2004/0033032 A1 | 2/2004 | Nakanishi | |
| 2006/0210225 A1 | 9/2006 | Fujiwara | |
| 2006/0245694 A1 | 11/2006 | Chen | |
| 2008/0144999 A1 | 6/2008 | Takeda | |
| 2011/0317959 A1 | 12/2011 | Ohta | |
| 2014/0119690 A1 | 1/2014 | Matsumoto | |
| 2015/0071593 A1 | 3/2015 | Kanke | |
| 2015/0212279 A1 | 7/2015 | Phan Huy et al. | |
| 2018/0259718 A1 | 9/2018 | Haase | |

FOREIGN PATENT DOCUMENTS

| | | |
|---|---|---|
| JP | 2001-083373 | 3/2001 |
| JP | 2002-357737 | 12/2002 |
| JP | 2004-317627 | 11/2004 |
| JP | 2005-202229 | 7/2005 |
| JP | 2011-095295 | 5/2011 |
| JP | 2012-047943 | 3/2012 |
| JP | 2013-057721 | 3/2013 |
| JP | 2015-014690 | 1/2015 |
| JP | 2016-080902 | 5/2016 |
| WO | WO 2014-055226 | 4/2014 |
| WO | WO 2014-055361 | 4/2014 |
| WO | WO 2015-038941 | 3/2015 |
| WO | WO 2017-065999 | 4/2017 |
| WO | WO 2017-066019 | 4/2017 |
| WO | WO 2017-066022 | 4/2017 |
| WO | WO 2017-066024 | 4/2017 |
| WO | WO 2017-066037 | 4/2017 |
| WO | WO 2017-066135 | 4/2017 |
| WO | WO 2017-066137 | 4/2017 |
| WO | WO 2017-066138 | 4/2017 |
| WO | WO 2017-066139 | 4/2017 |
| WO | WO 2017-066140 | 4/2017 |

* cited by examiner

OPTICAL FERRULES WITH WAVEGUIDE INACCESSIBLE SPACE

CROSS-REFERENCE TO RELATED APPLICATIONS

This application is a continuation of application Ser. No. 15/763,526, filed Mar. 27, 2018, which is a national stage filing under 35 U.S.C. 371 of PCT/US2016/055115, filed Oct. 3, 2016, which claims the benefit of Provisional Application No. 62/240,002, filed Oct. 12, 2015.

TECHNICAL FIELD

This disclosure relates generally to optical coupling devices such as optical ferrules.

BACKGROUND

Optical ferrules allow light from a one or more waveguides to pass through a first ferrule to a corresponding set of waveguides or other devices of a mating second ferrule. The optical ferrules may mechanically couple together and align optical elements of the first device with optical elements of the mating device. Optical ferrules are used for optical communications in a variety of applications including telecommunications networks, local area networks, data center links, and internal links in computer devices.

BRIEF SUMMARY

Some embodiments involve an optical ferrule including at least one light affecting element configured to affect one or more characteristics of light from an optical waveguide as the light propagates in the optical ferrule, the light affecting element having an input surface. At least one receiving element receives and secures the optical waveguide so that an output surface of the waveguide is optically coupled to the input surface of the light affecting element. A waveguide stop limits movement of the waveguide toward the input surface of the light affecting element when the optical waveguide is installed in the receiving element. A space between the output surface of the optical waveguide and the input surface of the light affecting element is inaccessible to the optical waveguide when the optical waveguide is installed in the receiving element.

Some embodiments are directed to an optical ferrule that includes at least one groove configured to receive and secure an optical waveguide. At least one light affecting element is configured to affect one or more characteristics of light from the optical waveguide as the light propagates in the optical ferrule, the light affecting element having an input surface proximate the groove. A waveguide stop disposed in the groove proximate to the input surface of the light affecting element restricts motion of the optical waveguide toward the input surface. A space between the input surface of the light affecting element and an output surface of the optical waveguide is inaccessible to the optical waveguide when the optical waveguide is installed in the groove.

BRIEF DESCRIPTION OF DRAWINGS

The figures are not necessarily to scale. Like numbers used in the figures refer to like components. However, it will be understood that the use of a number to refer to a component in a given figure is not intended to limit the component in another figure labeled with the same number.

DETAILED DESCRIPTION OF ILLUSTRATIVE EMBODIMENTS

When glass optical fibers are attached to optical ferrules, such as polymer optical ferrules, using an index-matched adhesive, problems may arise with delamination of the adhesive from the tip of the fiber and/or from the optical input surface of a light affecting element of the ferrule. Typically in these systems, the fiber is pushed into contact with the optical input surface, leaving a very thin layer of adhesive between the fiber tip and the optical input surface of the light affecting element. Differential thermal expansion, adhesive shrinkage, and/or mechanical force can put stress on this interface causing adhesive failure.

Embodiments disclosed herein relate to optical ferrules (also referred to as light coupling units or LCUs) having a waveguide inaccessible space between the end of the waveguide and the optical input surface. The disclosed approaches mitigate the problem of delamination by providing a reservoir of a relatively compliant material in the waveguide inaccessible space between the tip of the waveguide and the optical input surface. In some embodiments, the approaches disclosed herein may be used in conjunction with y-groove, or conventional v-groove, u-groove, or cylindrical-hole fiber positioning systems. In some embodiments, the approaches disclosed herein may be used in concert with grooves with centering sidewalls to control the waveguide position within the grooves.

The term waveguide or optical waveguide is used herein to refer to an optical element that propagates signal light. An optical waveguide comprises at least one core with a cladding, wherein the core and cladding are configured propagate light within the core, e.g., by total internal reflection. An optical waveguide may be, for example, a single or multimode waveguide, a single core fiber, a multi-core optical fiber, or a polymeric waveguide. A waveguide may have any suitable cross sectional shape, e.g., circular, square, rectangular etc.

Figure 1A:
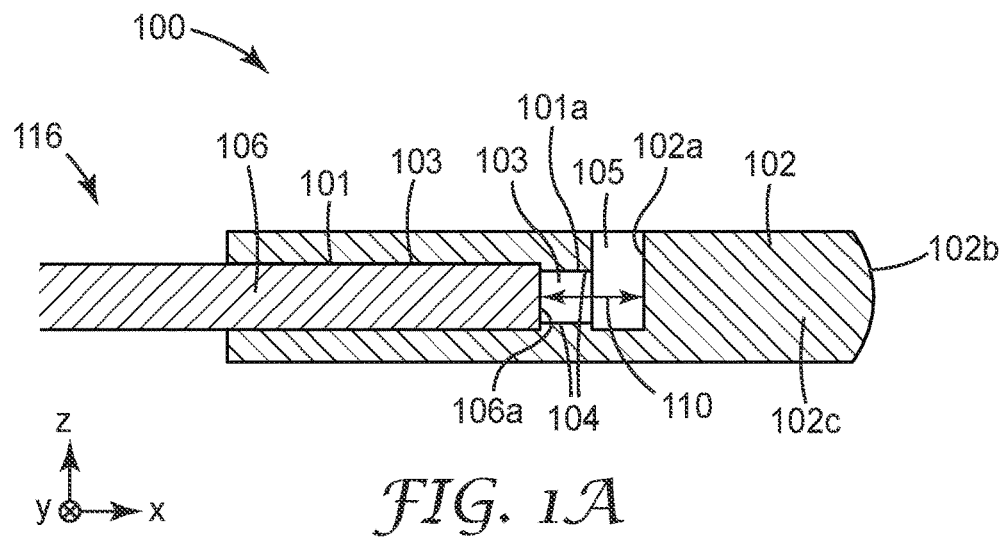
FIG. 1A is a cross sectional view of a single fiber optical ferrule in accordance with some embodiments.
Figure 1B:
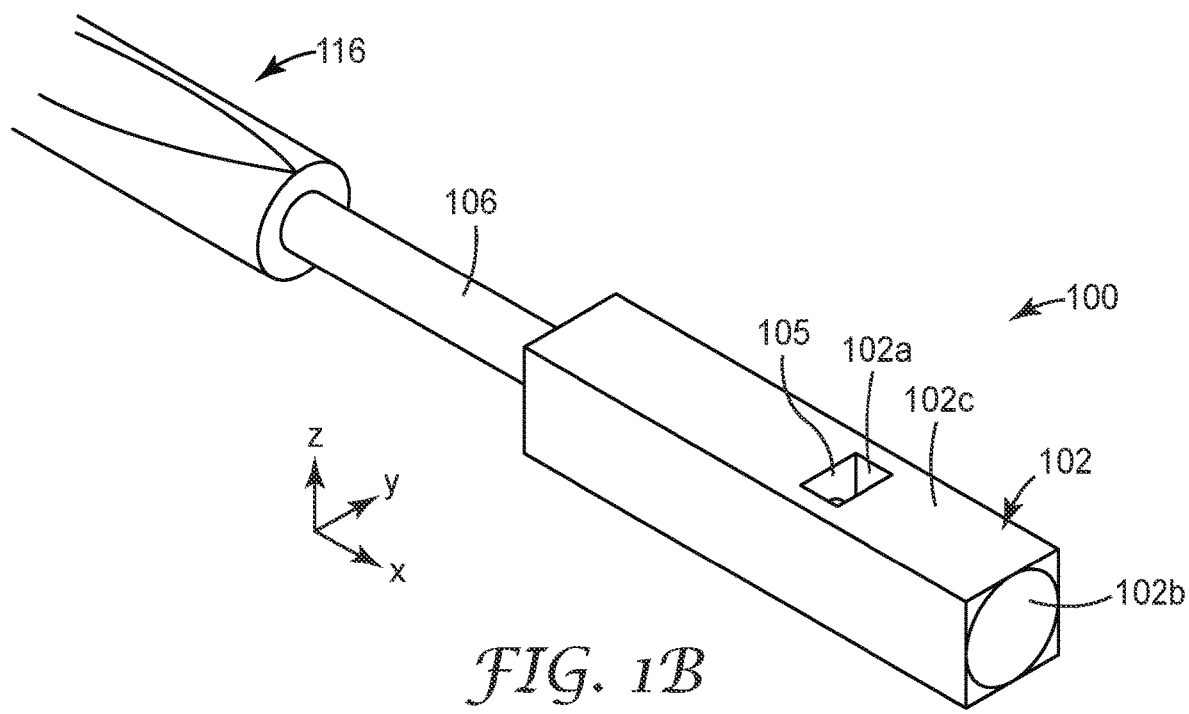
FIG. 1B is a perspective view of the optical ferrule of FIG. 1A.

FIG. 1A is a cross sectional view and FIG. 1B is a perspective view of an optical ferrule 100 in accordance with some embodiments. The optical ferrule 100 includes at least one receiving element 101 configured to receive and secure an optical waveguide 106. For example, as shown in FIG. 1A, the receiving element 101 may comprise a hole, e.g., a substantially cylindrical hole having a diameter greater than the diameter of the waveguide 106. The optical ferrule 100 includes at least one light affecting element 102. As shown in FIGS. 1A and 1B, the light affecting element 102 may comprise an input surface 102a, a lens 102b, and an intermediate section 102c between the input surface 102a and the lens 102b. The light affecting element 102 affects one or more characteristics of light from the waveguide 106 that propagates in the optical ferrule 100. For example, the one or more characteristics of light affected by the light affecting element may comprise a direction and/or the divergence of the light from the waveguide 106.

Figure 1C:
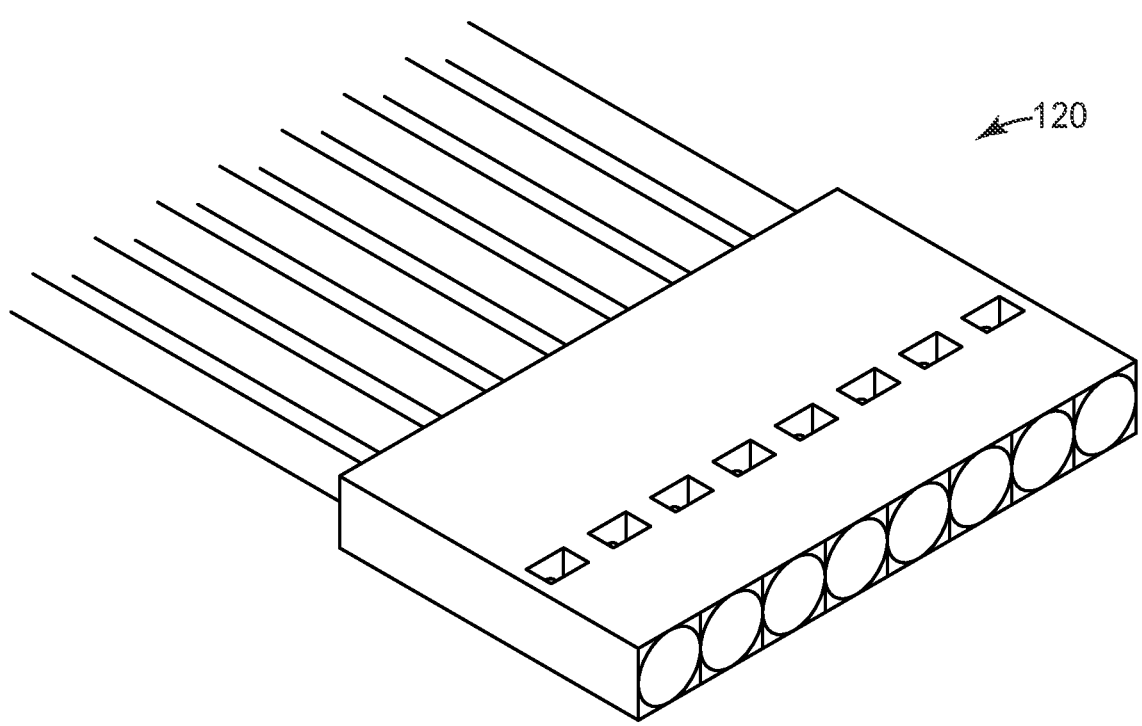
FIG. 1C is a perspective view of a multi-waveguide optical ferrule according to some embodiments.

An optical fiber 116 includes a waveguide 106 having a core, e.g., a glass core, and glass cladding, wherein the core and cladding are configured to propagate light within the core by total internal reflection. A buffer coating (not shown) may surround portions of the waveguide 106 of the optical fiber 116. In some embodiments, the optical fiber also includes a jacket. As shown in FIGS. 1A through 1C, the buffer coating and jacket of the optical fiber 116 may be stripped away so that just the waveguide 106 of the optical fiber 116 is inserted into the receiving element 101.

When the waveguide 106 is installed in the receiving element, the output surface of the waveguide 106a (also referred to herein as the "terminal end of the waveguide") is optically coupled to the input surface 102a of the light affecting element 102. The space 103 between the output surface 106a of the waveguide 106 and the input surface 102a of the light affecting element 102 is inaccessible to the waveguide 106.

A waveguide stop 104 may be disposed between the receiving element 101 and the light affecting element 102. The waveguide stop 104 restricts movement of the waveguide 106 along the x axis towards the light affecting element. As shown in FIG. 1A, the waveguide stop 104 can comprise a position along the hole 101 where the diameter of the hole is less than the diameter of the waveguide 106. The waveguide stop 104 limits further movement along the x-axis of the output surface 106a of waveguide 106 toward the input surface 102a of the light affecting element 102. The waveguide stop 104 limits further movement of the waveguide 106 along the x-axis so that the waveguide 106 cannot be pushed further within the hole 101 without damage to the waveguide 106 and/or to the ferrule 100. Some embodiments include an access port 105 configured so that the compliant material can be placed within the receiving element 101.

In some embodiments, the waveguide stop 104 is configured to stop further movement of the waveguide 106 such that the distance 110 along the x-axis between the output surface 106a of the waveguide 106 and the input surface 102a of the light affecting element 102 is greater than about 10 μm, greater than about 40 μm, greater that about 80 μm, or even greater than about 160 μm. In some embodiments, the distance between the waveguide stop 104 and the input surface 102a of the light affecting element 102 is greater than about 10 μm, greater than about 40 μm, greater that about 80 μm, or even greater than about 160 μm.

In some embodiments, at least a portion of the waveguide inaccessible space 103 forms a reservoir for containing one or more compliant materials. For example, the reservoir 103 may be filled with a compliant optical material, such as an optical adhesive, optical gel, or optical oil. The compliant optical material allows the light from the waveguide 106 to propagate through the inaccessible space 103 between the output surface 106a of the waveguide 106 and the input surface 102a of the light affecting element 102.

Figure 1D:
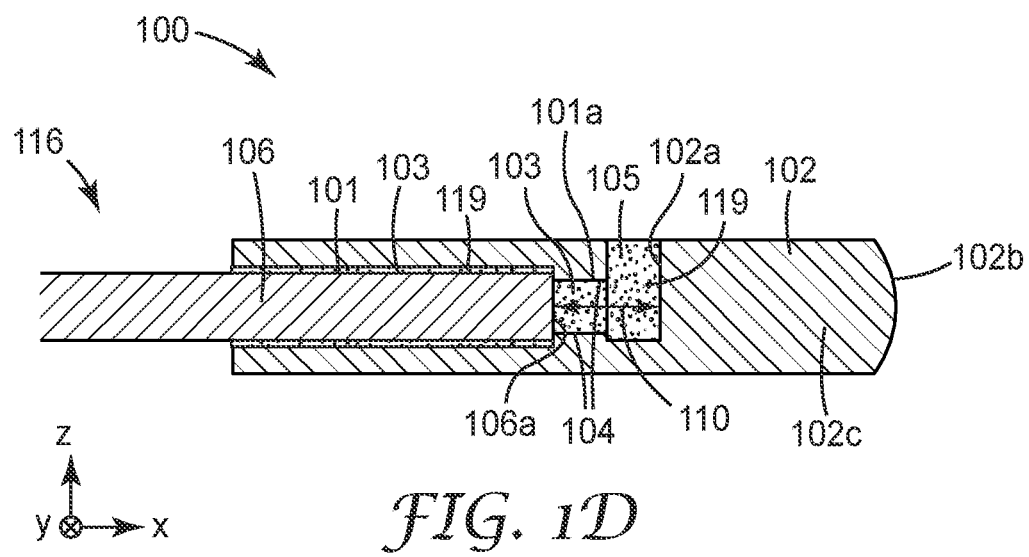
FIG. 1D is a cross sectional view of a single waveguide optical ferrule having a compliant optical adhesive that secures the waveguide to the ferrule and disposed in the inaccessible space in accordance with some embodiments.
Figure 1E:
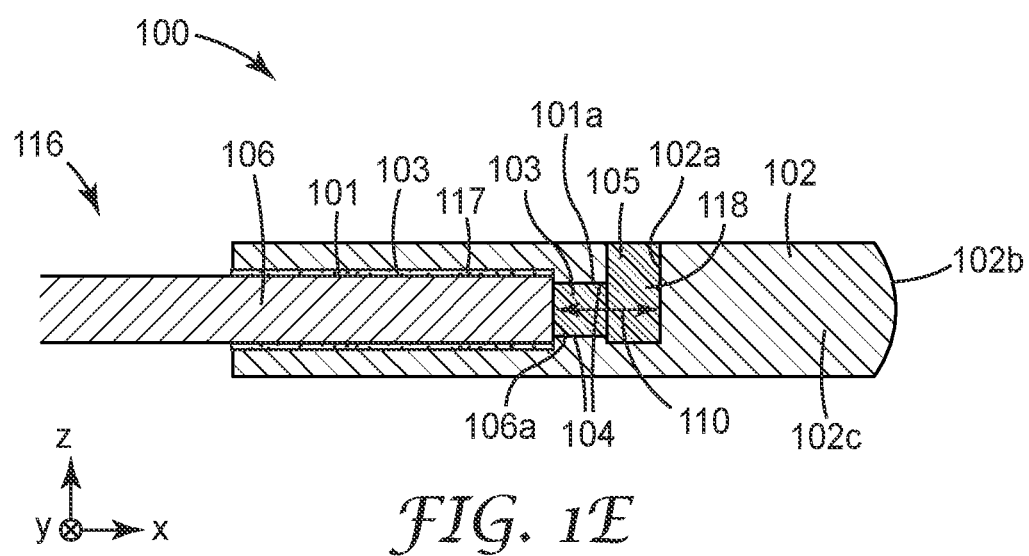
FIG. 1E is a cross sectional view of a single waveguide optical ferrule having an adhesive that secures the waveguide to the ferrule and a compliant optical material disposed in the inaccessible space in accordance with some embodiments.

In some embodiments, a compliant optical adhesive 119 may be used to secure the waveguide 106 to the ferrule 100 and the compliant optical adhesive 119 may also be disposed in the inaccessible space 103 as illustrated by FIG. 1D. In some implementations, as illustrated in FIG. 1E, an optical material 118, e.g. a compliant optical material such as an index oil or gel, can be disposed in the inaccessible space 103 wherein the optical material 118 differs from the adhesive 117 used to bond the waveguide 106 to the ferrule 100. When the bonding adhesive 117 is not used to fill the waveguide inaccessible space 103, the bonding adhesive 117 may, but need not be, an optical adhesive, that is, the bonding adhesive 117 need not be transparent to light from the optical waveguide 106.

The optical ferrule 100 shown in FIGS. 1A and 1B is illustrated as a single optical fiber ferrule, however, a similar construction as the one shown in FIGS. 1A and 1B may be replicated to form a multi-fiber optical ferrule 120 as shown in FIG. 1C.

As illustrated by FIG. 1A above, the waveguide stop may comprise a position along the hole where the diameter of the hole is less than the diameter of the terminal (output) end of the waveguide. In this scenario, the position of the waveguide stop may be the same as, or substantially the same as, the position of the terminal end of the waveguide. In some embodiments, the waveguide (or waveguide array) may include a feature other than the terminal end of the waveguide, e.g., a protrusion spaced apart from the waveguide terminal end, that engages with the waveguide stop of the optical ferrule to limit further movement of the waveguide toward the input surface of the light affecting element. For example, in some embodiments, the waveguides may comprise a planar waveguide array that includes a feature such as a divot, protrusion, through-hole, post, or collet on the waveguide array that registers with the waveguide stop features on the optical ferrule to limit further movement of the output surface of the waveguide toward the input surface of the light affecting element.

Figure 1F:
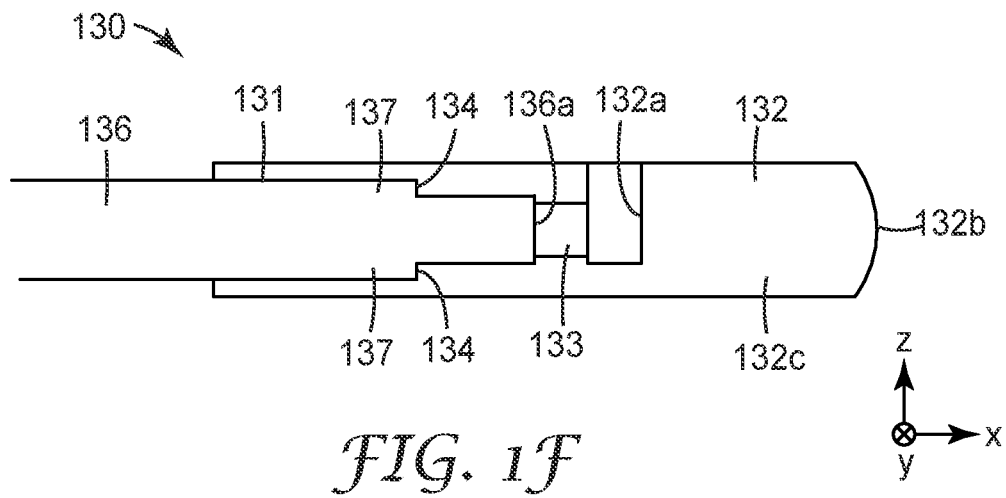
FIGS. 1F and 1G each show a cross sectional view of an optical ferrule illustrating a waveguide feature that engages with a waveguide stop of the optical ferrule in accordance with some embodiments; is a cross sectional view of a single waveguide optical ferrule in accordance with some embodiments.
Figure 1G:
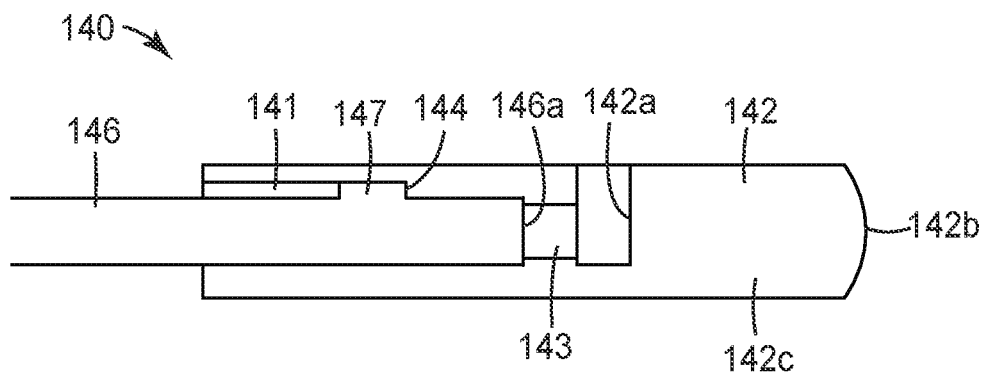

FIGS. 1F and 1G are cross sectional views of optical ferrules 130, 140 in accordance with some embodiments. The optical ferrule 130, 140 includes at least one receiving element, e.g. hole 131, 141, configured to receive and secure an optical waveguide 136, 146. The optical ferrule 130, 140 includes at least one light affecting element 132, 132. The light affecting element 132, 132 may comprise an input surface 132a, 142a, a lens 132b, 142b, and an intermediate section 132c, 142c between the input surface 132a, 132a and the lens 132b, 142b. The light affecting element 132, 142 affects one or more characteristics of light from the waveguide 136, 146 that propagates in the optical ferrule 130, 140.

When the waveguide 136, 146 is installed in the receiving element 131,141, the output surface of the waveguide 136a, 146a is optically coupled to the input surface 132a, 142a of the light affecting element 132, 142. The space 133, 143 between the output surface 136a, 136a of the waveguide 136, 146 and the input surface 132a, 142a of the light affecting element 132, 142 is inaccessible to the waveguide 136, 146.

A waveguide stop 134, 144 may be disposed between the receiving element 131, 141 and the light affecting element 132, 142. The waveguide stop 134, 144 restricts movement of the waveguide 136, 146 along the x axis towards the light affecting element 132, 142. As shown in FIGS. 1F and 1G, the waveguide stop 134, 144 can comprise a position along the hole 131, 141 where the sides of the hole engage with a protruding feature 137, 147 the waveguide 136, 146. The engagement of the protruding feature 137, 147 with the waveguide stop 134, 144 limits further movement along the x-axis of the output surface 136a, 146a of waveguide 136, 146 toward the input surface 132a, 142a of the light affecting element 132, 142. The protruding feature 137 can be symmetrical, e.g., a symmetrical etch of an optical fiber, as shown in FIG. 1F. Alternatively, the protruding feature 147 may be single sided as shown in FIG. 1G, e.g., the protruding feature may be formed by a single sided etch of a planar waveguide.

Figure 2A:
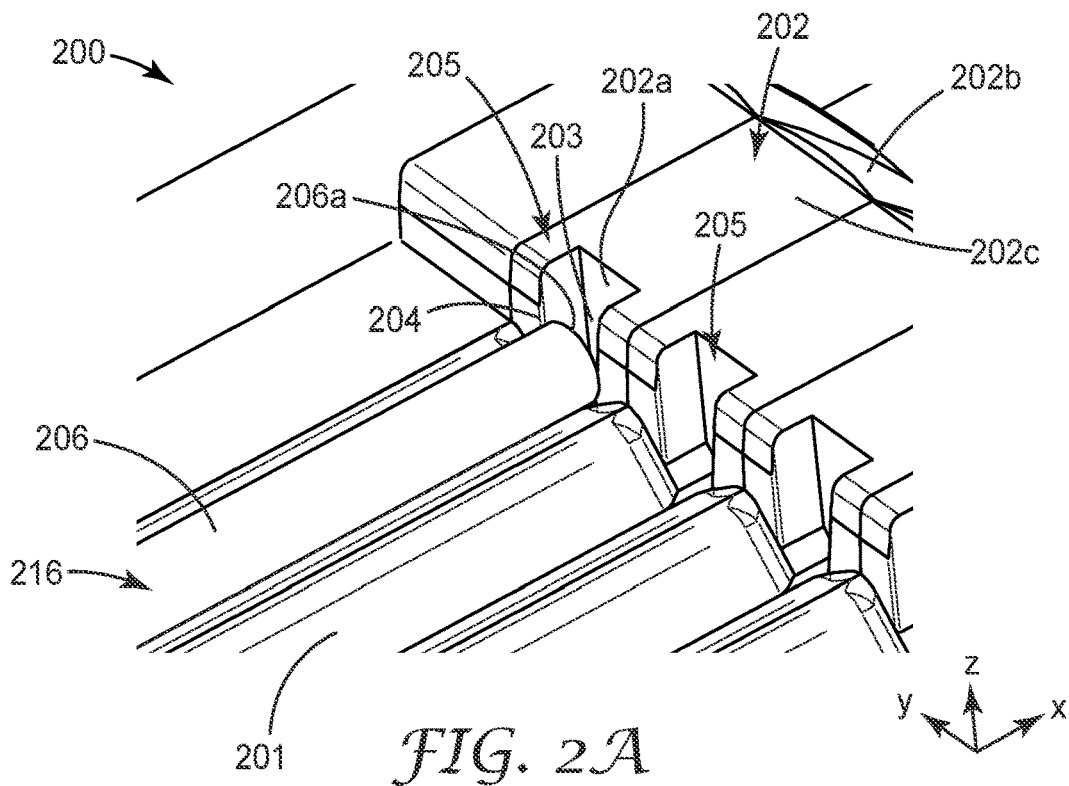
FIG. 2A is a perspective view of an optical ferrule according to some embodiments
Figure 2B:
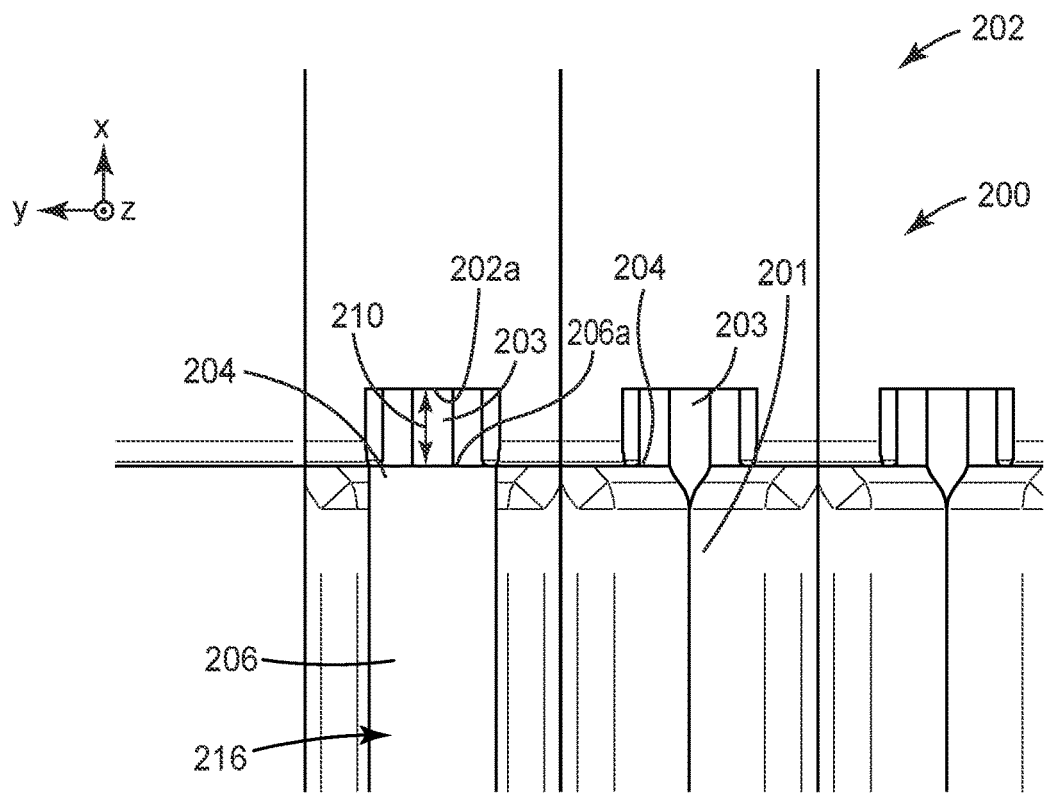
FIG. 2B is a plan view of the optical ferrule of FIG. 2A.
Figure 2C:
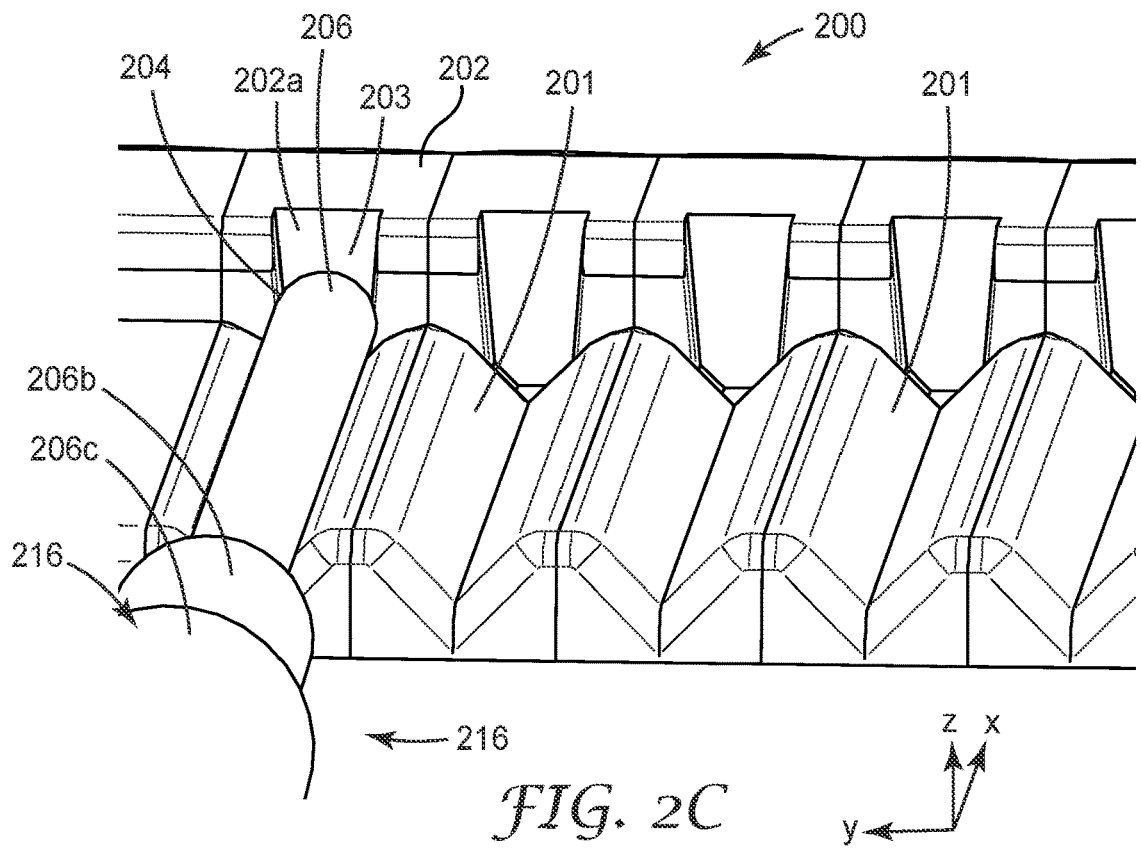
FIG. 2C is another perspective view of the optical ferrule of FIG. 2A.

FIG. 2A is a perspective view, FIG. 2B is a plan view, and FIG. 2C is another perspective view of an optical ferrule 200 according to some embodiments. The optical ferrule 200 includes at least one receiving element 201 configured to receive and secure an optical waveguide 206. In FIGS. 2A through 2C, the receiving element 201 of the optical ferrule 200 is shown as a V-shaped groove. Alternatively, the groove may have a U shape, a Y shape, or any other suitable shape.

The optical ferrule 200 includes at least one light affecting element 202. As shown in FIGS. 2A through 2C, the light affecting element 202 may comprise an input surface 202a, a light redirecting element 202b, and an intermediate section 202c between the input surface 202a and the light redirecting element 202b. When the optical waveguide 206 is installed in the receiving element 201 the output surface 206a of the optical waveguide is optically coupled to the input surface 202a of the light affecting element 202. The light affecting element 202 affects one or more characteristics of light from the waveguide 206 that propagates in the optical ferrule 200.

An optical fiber 216 includes a waveguide 206 having a core, e.g., a glass core, and glass cladding, wherein the core and cladding are configured to propagate light within the core by total internal reflection. A buffer coating 206b surrounds the waveguide 206 of the optical fiber 216. In some embodiments, the optical fiber also includes a jacket 206c. As shown in FIGS. 2A through 2C, the buffer coating 206b and jacket 206c of the optical fiber 216 may be stripped away so that just the waveguide 206 of the optical fiber 216 is inserted into the receiving element 201. The space 203 is inaccessible to the waveguide 206 of the optical fiber 216.

In some embodiments, the ferrule 200 includes a waveguide stop 204 that limits further movement of the waveguide 206 along the x-axis so that the waveguide 206 cannot be pushed further along the groove 201 without damage to the waveguide 206 and/or to the ferrule 200. As shown in FIGS. 2A through 2C, the waveguide stop 204 can comprise a wall with an opening 205 for adhesive or other compliant material. The space 203 between the output surface 206a of the waveguide 206 and the input surface 202a of the light affecting element 202 is inaccessible to the waveguide 206. In some embodiments, the waveguide stop 204 is configured to stop further movement of the waveguide 206 such that the distance 210 along the x axis between the output surface 206a of the waveguide 206 and the input surface 202a of the light affecting element 202 is greater than about 10 µm, greater than about 40 µm, or greater that about 80 µm or even greater than about 160 µm. The inaccessible space 203 may be filled with a compliant optical material, such as an optical adhesive, optical gel, or optical oil. For example, an optical adhesive may be used, that secures the waveguide 206 to the ferrule 200. For example, the compliant material may be selected such that the light from the waveguide 206 propagates substantially unimpeded through the inaccessible space 203 between the output surface 206a of the waveguide 206 and the input surface 202a of the light affecting element 202.

Figure 3A:
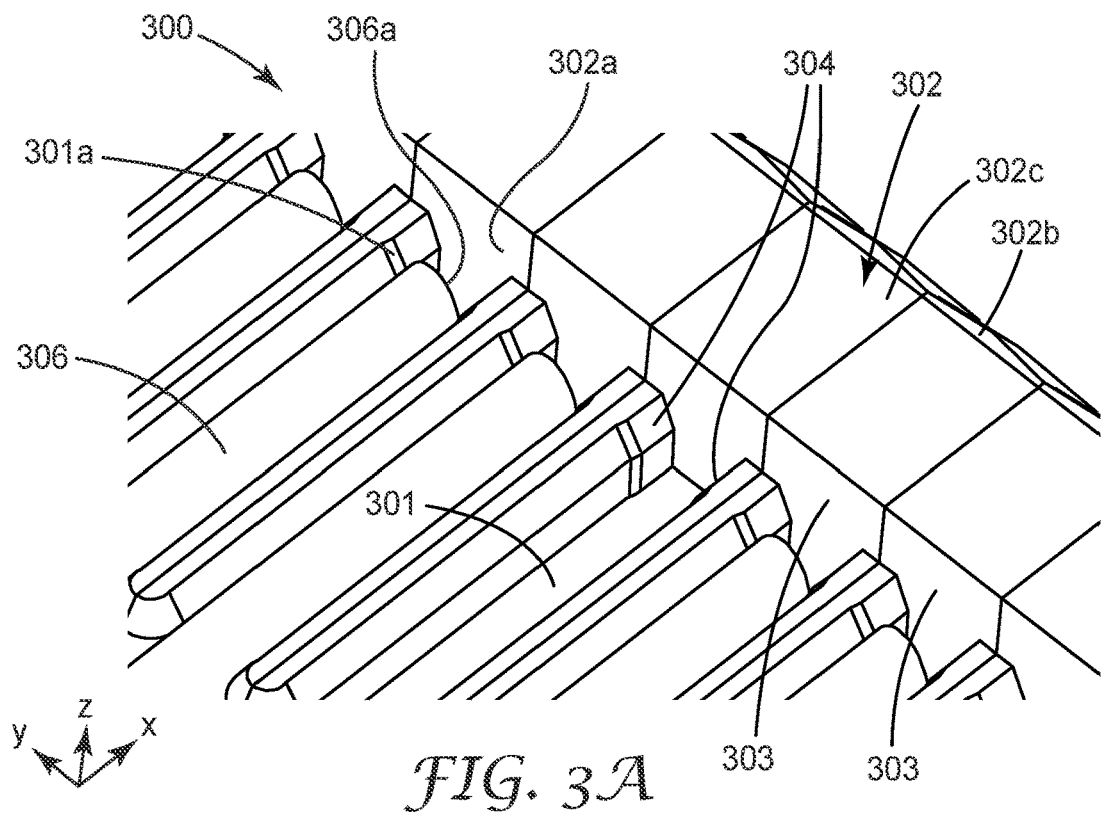
FIG. 3A is a perspective view of an optical ferrule according to some embodiments
Figure 3B:
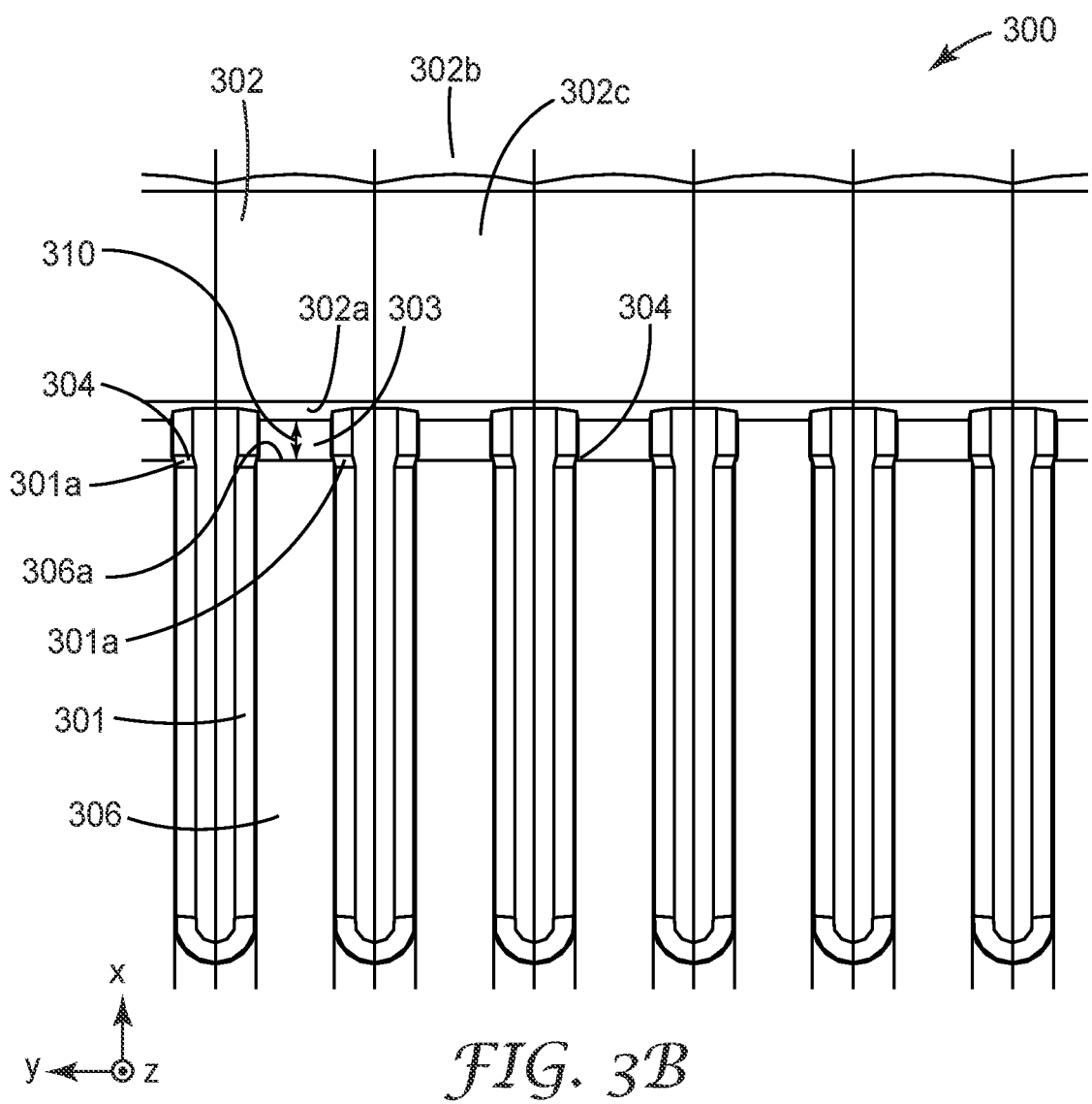
FIG. 3B is a plan view of the optical ferrule of FIG. 3A.
Figure 3C:
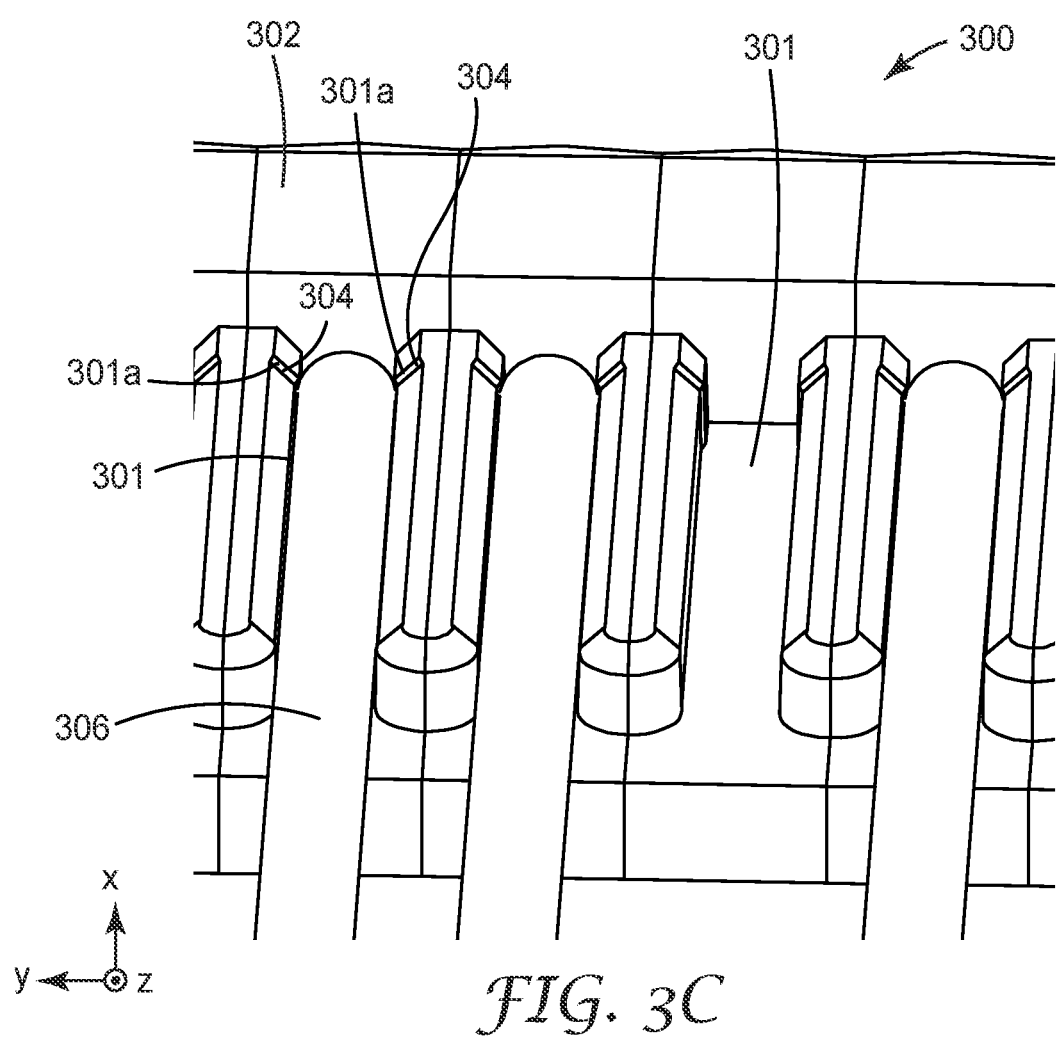
FIG. 3C is another perspective view of the optical ferrule of FIG. 3A.

FIG. 3A is a perspective view, FIG. 3B is a plan view, and FIG. 3C is another perspective view of an optical ferrule 300 according to some embodiments. The optical ferrule 300 includes at least one receiving element 301 configured to receive and secure an optical waveguide 306. In FIGS. 3A through 3C, the receiving element 301 of the optical ferrule 300 is shown as a Y shaped groove with centering sidewalls 301a. The centering sidewalls 301a are angled to center the waveguide 306 along the y axis with respect to the input surface 302a of the light affecting element 302.

The optical ferrule 300 includes at least one light affecting element 302. As shown in FIGS. 3A through 3C, the light affecting element 302 may comprise an input surface 302a, a light redirecting element 302b, and an intermediate section 302c between the input surface 302a and the light redirecting element 302b. The light affecting element 302 affects one or more characteristics of light from the waveguide 306 that propagates in the optical ferrule 300.

The ferrule 300 includes a waveguide stop 304 that is configured to prevent further motion of the waveguide 306 along the x axis toward the input side 302a of the light affecting element. The waveguide stop 304 prevents the waveguide 306 from being pushed further within the groove 301 toward the input side 302a of the light affecting element 302 without damage to the waveguide 306 and/or to the ferrule 300. As shown in FIGS. 3A through 3C, the waveguide stop 304 can comprise a position along the centering features 301a where the distance between the sidewalls of the groove 301 at the waveguide stop 304 becomes less than a diameter of the waveguide 306. The space 303 (shown in FIG. 3B) between the output surface 306a of the waveguide 306 and the input surface 302a of the light affecting element 302 is inaccessible to the waveguide 306. In some embodiments, the waveguide stop 304 is configured to stop further movement of the waveguide 306 such that the distance 310 along the x axis between the output surface 306a of the waveguide 306 and the input surface 302a of the light affecting element 302 is greater than about 10 μm, greater than about 40 μm, greater that about 80 μm or even greater than about 160 μm.

The inaccessible space 303 (see FIG. 3B) may be filled with a compliant optical material, such as an optical adhesive, optical gel, or optical oil. For example, an optical adhesive may be used that secures the waveguide 306 to the ferrule 300. The compliant optical material allows the light from the waveguide 306 to propagate substantially unimpeded through the inaccessible space 303 (see FIG. 3B) between the output surface 306a of the waveguide 306 and the input surface 302a of the light affecting element 302.

Attachment of optical waveguides or fibers to optical or optoelectronic devices is often done with V-shaped grooves (i.e., V-grooves). The waveguides are forced into the bottom of the groove (typically a 90° angle V-groove) with a clamping mechanism. Typically, an index-matching adhesive is then applied to permanently hold the waveguides in the V-groove. This scheme has several challenges. The clamping mechanism must provide sufficient force to bend the waveguides to seat them in and thus align them with the grooves, yet have sufficient compliance to contact each waveguide of a ribbon of waveguides. It must also allow access for the application of the adhesive without itself becoming bonded to the waveguides. The position of the clamping mechanism over the V-grooves makes it difficult to observe the positions of the waveguides, or to use a light-cured adhesive. Use of U-shaped grooves (i.e., U-grooves) with flat bottoms and vertical sidewalls have several challenges. Issues with the ease of capture of the waveguides and with the positional error associated with the clearance required for the groove width have not been previously addressed.

Embodiments are directed to a light coupling unit having one or a multiplicity of grooves configured to receive and permanently attach to one or a multiplicity of optical waveguides. In one embodiment, a portion of a groove provides nearly vertical sidewalls that allow an optical waveguide to be bent laterally into the correct position. The groove can be formed wider at the top, providing a substantially Y-shaped cross-section (i.e., Y-groove) that facilitates capturing an optical waveguide into the groove. As was discussed previously, the optical waveguides can be single-mode optical waveguides, multi-mode optical waveguides, or an array of single-mode or multi-mode optical waveguides. In some embodiments, the waveguides are single-mode or a multi-mode polymer optical waveguide.

In another embodiment, a portion of a groove provides nearly vertical sidewalls that allow an optical waveguide to be bent laterally into the correct position. This portion of the groove can be made slightly wider than the diameter of the optical waveguide to provide clearance for initial capture of the optical waveguide. Once in contact with and approximately parallel to the bottom of the groove, the end of the optical waveguide is slid axially into a location where the width of the groove gradually narrows to less than the diameter of the optical waveguide. Here the tip of the optical waveguide stops, and is correctly positioned. The groove, according to some embodiments, can be formed wider at the top, providing a substantially Y-shaped cross-section that facilitates capturing an optical waveguide into the groove.

Figure 4:
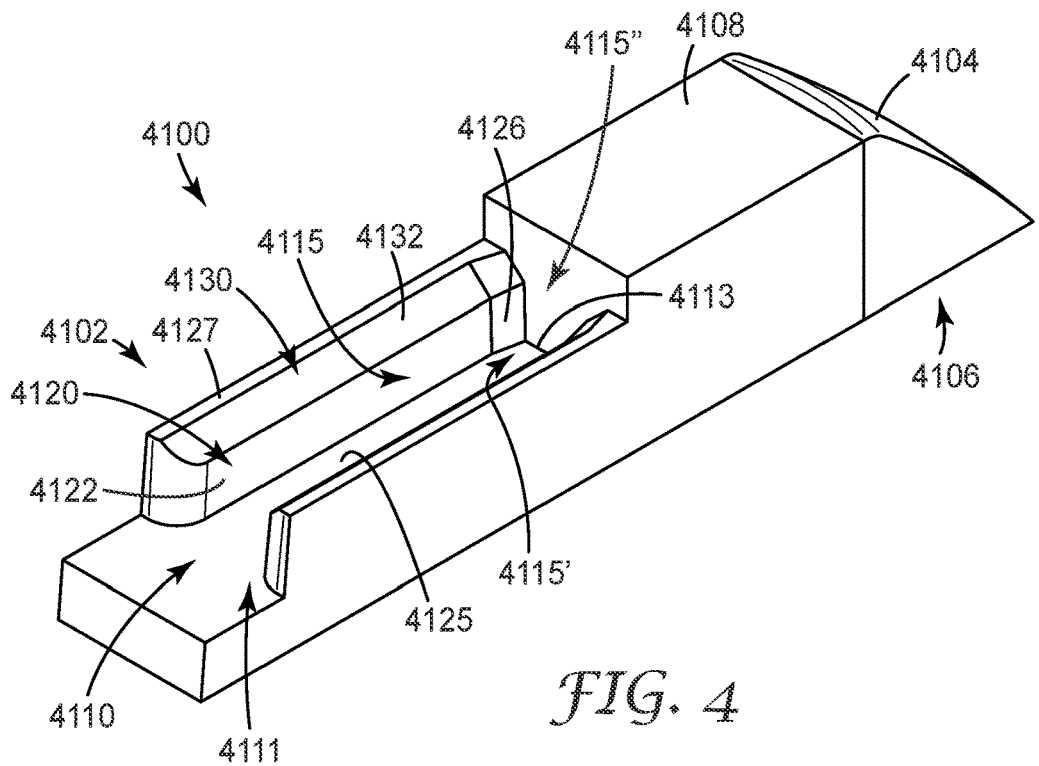
FIG. 4 illustrates a portion of an optical ferrule that incorporates a compound groove having a centering arrangement in accordance with various embodiments.
Figure 5:
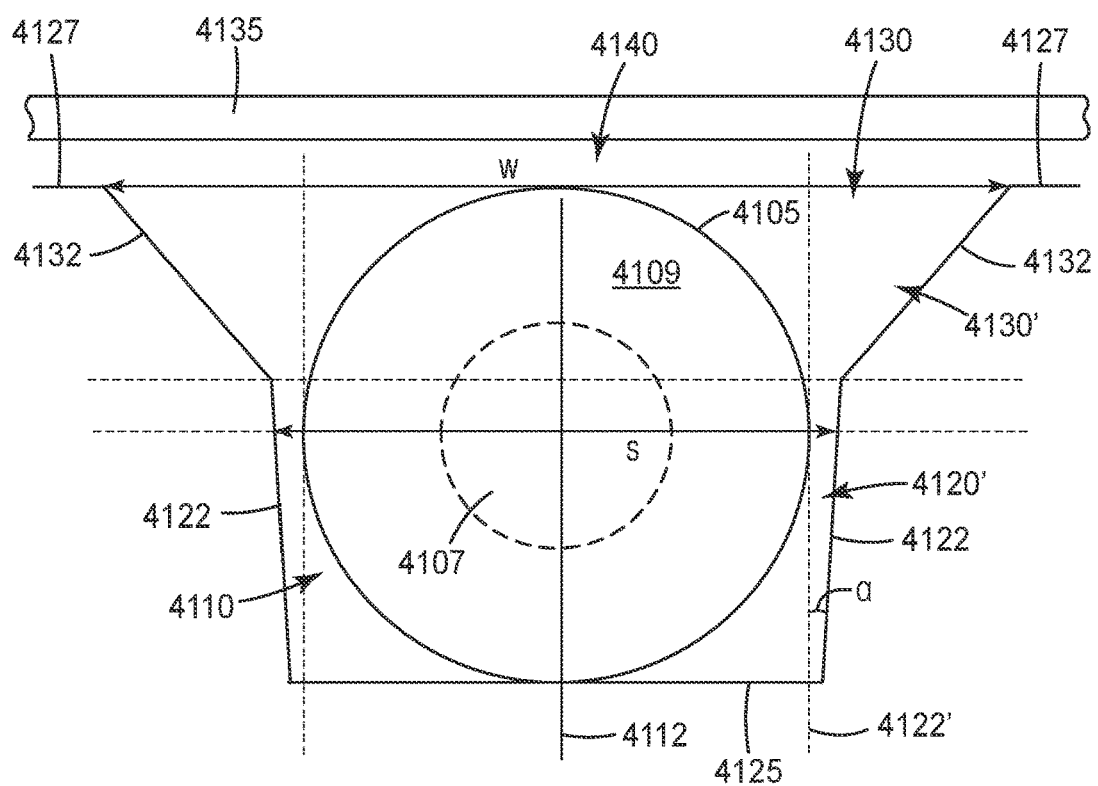
FIG. 5 illustrates various details of the compound groove shown in FIG. 4, the groove configured to receive an optical waveguide.

FIG. 4 illustrates a portion of an LCU 4100 in accordance with various embodiments. The LCU 4100 shown in FIG. 4 includes a single LCU attachment area 4102. Although a single LCU attachment area 4102 is shown in FIG. 4, it is understood that a multiplicity of attachment areas 4102 can be provided on the LCU 4100 for receiving and permanently attaching to a multiplicity of optical waveguides. The LCU attachment area 4102 includes a Y-groove 4110 having an entrance 4111, a terminal end 4113, and a central plane 4112 (see FIG. 5) extending between the entrance 4111 and the terminal end 4113. The central plane 4112, as shown in FIG. 5, is a plane bisecting a bottom surface 4125 of the Y-groove 4110 and extending perpendicularly from the bottom surface 4125. The Y-groove 4110 is configured to receive an optical waveguide, such as the generally cylindrical waveguide 4105 shown in FIG. 5.

The LCU 4100 includes a light redirecting member 4104 and an intermediate section 4108 between the light redirecting member 4104 and the terminal end 4113. In some embodiments, the terminal end 4113 comprises an optically clear member, such as a lens, or is formed from optically transparent material. The intermediate section 4108 is formed from an optically transparent material. The light redirecting member 4104 includes an output side 4106 through which light exits from (or enters into) the light directing member 4104.

According to some embodiments, and with reference to FIGS. 4 and 5, the Y-groove 4110 is a compound groove formed by a generally U-shaped lower portion 4120 and an expanded upper portion making the compound groove generally Y-shaped. It is understood that the terms U and Y modifying the term groove serve to connote an approximate shape of these grooves for purposes of convenience and not of limitation.

As is best seen in FIG. 5, the Y-groove 4110 is defined by a first region 4120', a second region 4130', an opening 4140, and a bottom surface 4125. The first region 4120' is defined between the bottom surface 4125 and the second region 4130'. The first region 4120' includes substantially parallel sidewalls 4122 separated by a spacing, S. The sidewalls 4122 can have a draft of one or a few degrees (e.g., <about 10 degrees) in a direction off vertical, and as such, may be considered to be substantially parallel to one another. For example, the sidewalls 4122 can be normal to the bottom surface 4125 to within about 5 degrees. The sidewalls 4122 can have a slight outward slope or draft to facilitate mold release of the sidewalls 4122 during fabrication. In this case, the substantially vertical sidewalls 4122 form a draft angle, α, with a plane 4112 extending perpendicular from the bottom surface 4125.

The second region 4130' is disposed between the first region 4120' and the opening 4140. The opening 4140 is defined between top surfaces 4127 of the Y-groove 4110. A width, W, of the opening 4140 is greater than the spacing, S, between the sidewalls 4122. As can be seen in FIG. 42, the first region 4120' defines the U-shaped lower portion 4120 of Y-Y-groove 4110 and the second region 4130' defines the expanded upper portion 4130.

The second region 4130' includes sidewalls 4132 that extend outwardly from the central plane 4112 of the Y-groove 4110. In FIG. 42, the sidewalls 4132 comprise linear sidewalls, which may be considered chamfered sidewalls. In other embodiments, the sidewalls 4132 may be non-linear, such as by having some degree of curvature. The sidewalls 4132 extend between the first region 4120' and the opening 4140, with a spacing between the sidewalls 4132 progressively increasing from the first region 4120' to the opening 4140.

According to some embodiments, a width, W, of the opening 4140 is greater than the spacing, S, of the first region 4120' by a distance equal to about half of the spacing, S. In other embodiments, the width, W, of the opening 4140 is greater than the spacing, S, by a distance greater than half of the spacing, S. A height of the sidewalls 4122 of the first region 4120' can be greater than about 50% of the height of the waveguide 4105. For example, a height of the sidewalls 4120 of the first region 4120' can range between about 50% and 75% of the height of the optical waveguide 4105. In some embodiments, the height of the sidewalls 4122 of the first region 4120' can be greater than about 62.5 to 65 μm but less than a height of an optical waveguide 4105. In other embodiments, the height of the sidewalls 4122 of the first region 4120' can be greater than about 75 μm but less than a height of an optical waveguide 4105. In the embodiment shown in FIG. 5, the overall height of the Y-groove 4110 is about equal to the height of the waveguide 4105 (e.g., about 125 μm). In some embodiments, the overall height of the Y-groove 4110 can be less than or greater than the height of the waveguide 4105. A cover 4135 (optional) may be configured to cover the optical waveguides 4105 and grooves 4110 of the LCU 4100.

As can be seen in FIG. 5, spacing between the sidewalls 4122 of the first region 4120' in a region of closest approach to the optical waveguide 4105 is larger than the width of the waveguide by a predetermined clearance. In some embodiments, the predetermined clearance can be less than about 1 μm. In other embodiments, the predetermined clearance can be between about 1 and 3 μm. In further embodiments, the predetermined clearance can be between about 1 and 5 μm. For example, an optical waveguide 4105 can have a width of about 125 μm, and the spacing separating the sidewalls 4122 of the first region 4120' can include a clearance of about 1 to 5 μm.

In embodiments that employ a waveguide 4105 comprising multi-mode fiber, the predetermined clearance can be between about 1 and 5 μm. For example, the predetermined clearance can be equal to about 0.8 to 4% of the width of an optical waveguide 4105 that comprises multi-mode fiber. In embodiments that employ a waveguide 4105 comprising single mode fiber, the predetermined clearance can be between about 0 and 2 μm. For example, the predetermined clearance can be equal to about 0 to 1.6% of a width of an optical waveguide 4105 that comprises single mode fiber. In some cases, the clearance may be less than 0, so that the waveguide 4105 deforms the Y-groove 4110 when placed in it.

Figure 6:
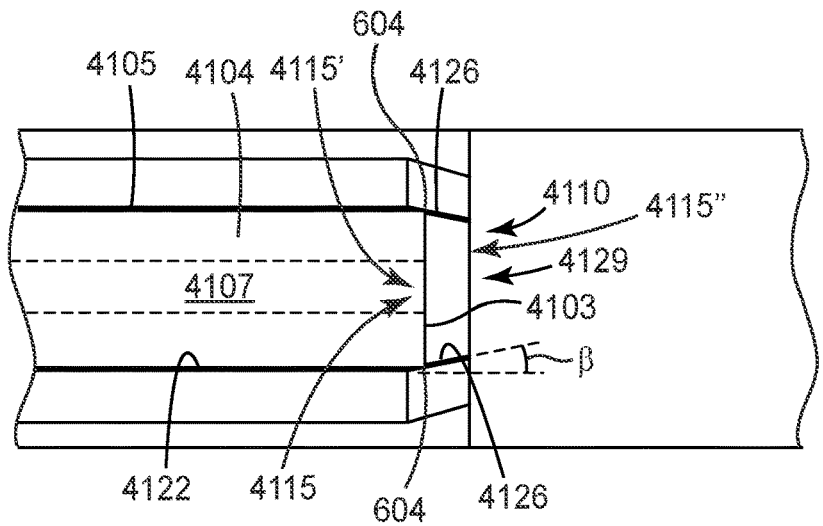
FIG. 6 illustrates a longitudinal transition section of the groove shown in FIG. 4.

The waveguide 4105 shown in FIGS. 5 and 6 includes a core 4107 surrounded by cladding 4109. It is important that the core 4107 be optically aligned with the light redirecting member (see 4104 in FIG. 41) when the waveguide 4105 is permanently bonded in place within the Y-groove 4110 using an optical (index-matched) bonding material. In some embodiments, the Y-groove 4110 includes a centering arrangement by which the waveguide 4105 is forcibly guided laterally toward a central plane 4112 of the Y-groove 4110 when the waveguide 4105 is installed in the Y-groove 4110. In addition to centering the core 4107 along a central plane 4112 of the Y-groove 4110, the centering arrangement provides a waveguide stop that limits axial displacement of the waveguide 4105 within the Y-groove 4110. As such, a compound Y-groove 4110 according to some embodiments includes a centering arrangement in combination with a U-groove alone or a Y-groove.

FIGS. 4 and 6 show a Y-groove 4110 that incorporates a centering arrangement defined by a longitudinal transition section 4115 comprising a first end 4115' and a second end 4115". The first end 4115' has a width equal to the spacing, S, between the sidewalls 4122 of the first region 4120'. The second end 4115" has a width less than a width of the optical waveguide 4105. The sidewall spacing progressively reduces within the transition section 4115, such as by the sidewalls angling inwardly in the transition section 4115. The transition section 4115 comprises centering sidewalls 4126 which can originate from terminal ends of sidewalls 4122 and project inwardly toward the central plane of the Y-groove 4110. The centering sidewalls 4126 may be considered chamfered sidewalls of the Y-groove 4110. The sidewalls 4122 and centering sidewalls 4126 of the transition section 4115 can comprise substantially planar sidewall surfaces or non-planar sidewall surfaces.

The centering sidewalls 4126 form an angle, β, with the sidewalls 4122 that can range between about 5 and 45 degrees. The longitudinal transition section 4115 need not be very long relative to the overall length of the Y-groove 4110. For example, length of the Y-groove 4110 can be between 200 μm and 2000 μm, and the centering sidewalls 4126 can extend from the sidewalls 4122 by a distance of about 2 μm to 50 μm. The centering sidewalls 4126 can have the same height as that of the sidewalls 4122.

As the waveguide 4105 is displaced axially within the Y-groove 4110 toward the light redirecting member 4104, the terminal end 4103 of the waveguide 4105 contacts the centering sidewalls 4126 and is guided toward the central plane of the Y-groove 4110 so that the central axis of the waveguide 4105 is centered within the Y-groove 4110. A gap 4129 is defined between terminal ends of the centering sidewalls 4126. The gap 4129 is sufficiently wide to allow unimpeded passage of light emanating from the core 4107 of the waveguide 4105. The length of the centering sidewalls 4126 and width of the gap 4129 are preferably sized to accommodate the core and cladding dimensions of the waveguide 4105. With the terminal end 4103 of the waveguide 4105 properly centered within the Y-groove 4110 by the centering arrangement, the cladding 4109 is in contact with the centering sidewalls 4126 at the position of the waveguide stop 604, and the core 4107 is aligned with the center of the gap 4129. It is understood that the centering arrangement shown in FIG. 43 may be implemented in a U-groove, or in a compound U-groove such as a Y-groove.

Figure 7:
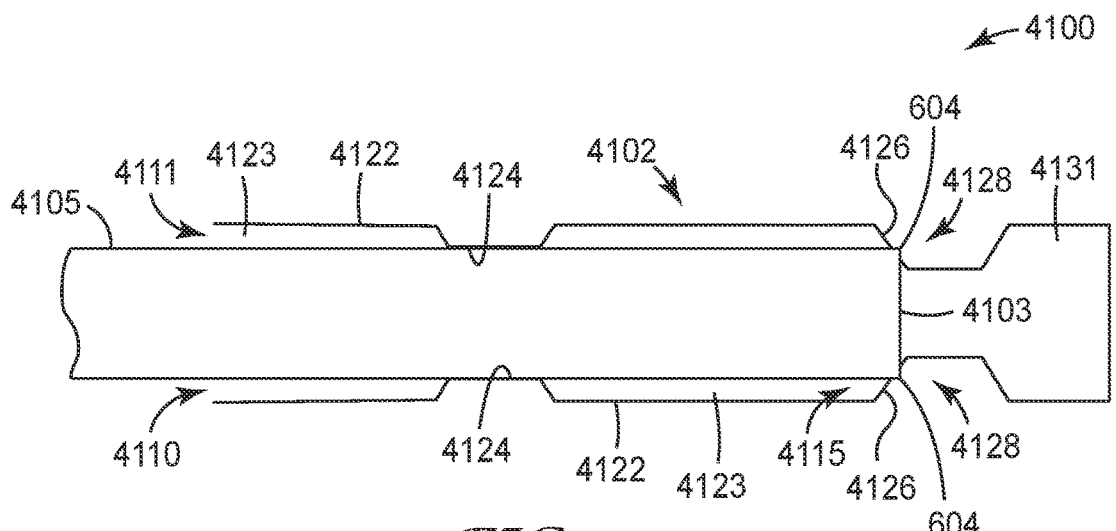
FIG. 7 is a top view of an optical ferrule attachment area comprising a forward adhesive cavity in accordance with various embodiments.

FIG. 7 shows a top view of an LCU attachment area 4102 of an LCU 4100 in accordance with various embodiments. The LCU attachment area 4102 illustrated in FIG. 7 shows the terminal end 4103 of the waveguide 4105 centered within the Y-groove 4110. The embodiment of the Y-groove 4110 illustrated in FIG. 7 includes an alignment feature between the entrance 4111 and the longitudinal transition section 4115 of the Y-groove 4110. The alignment feature includes a protruded section 4124 of the groove sidewalls 4122. The spacing between opposing protruded sections 4124 is slightly greater than the width of the waveguide 4105 and less than the spacing between opposing sidewalls 4122. The protruded sections 4124 of the alignment feature serve to provide angular alignment of the waveguide 4105 with respect to the central plane of the Y-groove 4110 when the waveguide end 4103 is positioned in the transition section 4115 of the Y-groove 4110. In some embodiments, the alignment feature formed by protruded sections 4124 is located at or near the groove entrance 4111.

In the embodiment illustrated in FIG. 7, the edges of the terminal end 4103 of the waveguide 4105 are shown slightly embedded in the centering walls 4126 of the transition section 4115 at the position of the waveguide stop 604. In this embodiment, the cladding 4109 of the waveguide 4105 is formed of a material (e.g., glass) that is harder than the material used to form the centering walls 4126. A deformation 4128 in the centering walls 4126 can be formed by applying an axially directed force to the waveguide 4105 when the terminal end 4103 of the waveguide 4105 rests against the centering walls 4126 at its centered position. The deformation 4128 helps to maintain proper centered positioning of the waveguide 4105 within the Y-groove 4110 when optical bonding material is applied to permanently bond the waveguide 4105 within the Y-groove 4110.

The embodiment of the Y-groove 4110 shown in FIG. 7 incorporates a bonding region 4123 defined between the sidewalls 4122 of the Y-groove 4110 and the outer periphery of the waveguide 4105. The bonding region 4123 can be filled with bonding material (e.g., optical bonding material) which, when cured, permanently bonds the waveguide 4105 within the Y-groove 4110. In some embodiments, the bonding region 4123 is defined as a volume between the waveguide 4105, the planar bottom surface 4125, and the sidewalls 4122. In other embodiments, a depression or trough can be formed along a portion of the sidewalls 4122 where the bottom surface 4125 meets the sidewalls 4122 so as to increase the volume of bonding material captured within the Y-groove 4110.

Figure 8:
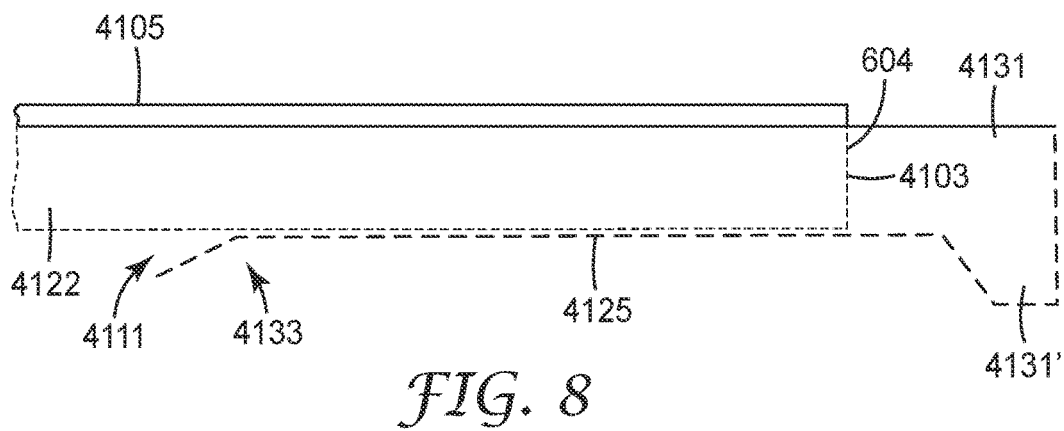
FIG. 8 is a side view of the optical ferrule attachment area shown in FIG. 7.
Figure 9:
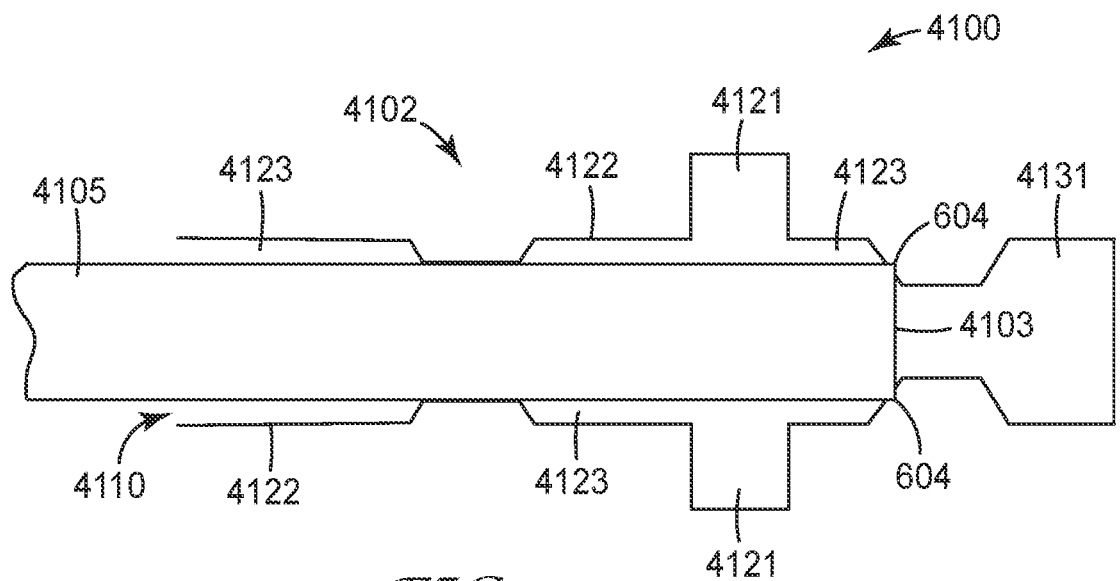
FIG. 9 is a top view of an optical ferrule attachment area comprising lateral adhesive cavities in accordance with various embodiments.

FIG. 7 also shows a forward adhesive cavity 4131 configured to receive a volume of optical bonding material which, when cured, serves to increase the strength (e.g., integrity) of the bond between the terminal end 4103 of the waveguide 4105 and the LCU attachment area 4102. In some embodiments, the adhesive cavity 4131 is configured to transmit light from an end of the waveguide 4105. As is shown in FIG. 8, the forward adhesive cavity 4131 can include a depression 4131' formed into the bottom surface 4125 of the LCU attachment area 4102. The depression 4131' serves to increase the total volume of the forward adhesive cavity 4131 for receiving an optical bonding material, thereby enhancing the strength/integrity of the bond between the terminal end 4103 of the waveguide 4105 and the LCU attachment area 4102. FIG. 9 also shows the entrance 4111 of the Y-groove 4110 at a location 4133 where the bottom surface 4125 of the groove 110 transitions from a slope to a plateau.

Figure 10:
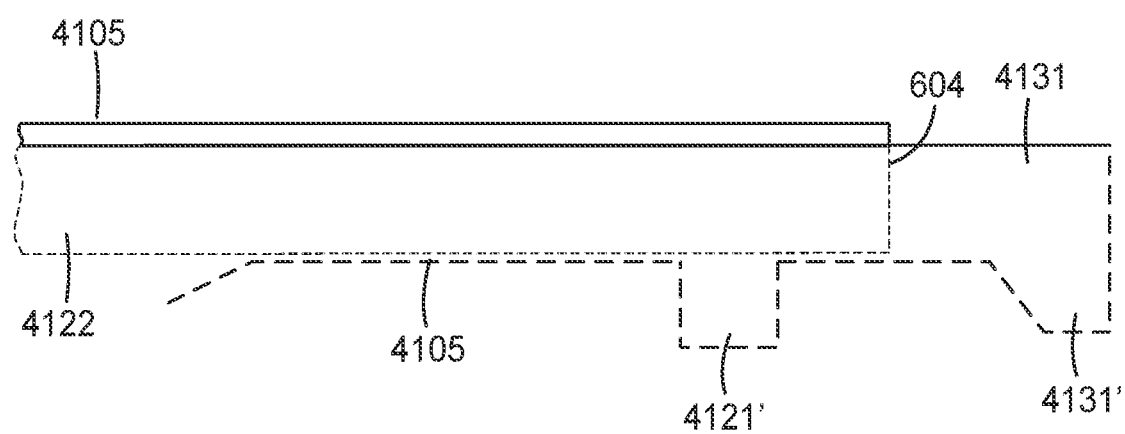
FIG. 10 is a side view of the optical ferrule attachment area shown in FIG. 9.

FIG. 9 shows the bonding regions 4123 and forward adhesive cavity 4131 illustrated in FIG. 7 and, in addition, shows a lateral adhesive cavity 4121 extending laterally from each sidewall 4122 of the Y-groove 4110. The lateral adhesive cavities 4121 can be extended portions of the bonding regions 4123. The lateral adhesive cavities 4121 provide a volume for receiving additional bonding material near the sides of the terminal end 103 of the waveguide 4105, which increases the strength/integrity of the bond between the Y-groove 4110 and the waveguide 4105. As is shown in FIG. 10, the lateral adhesive cavity 4121 can include a depression 4121' formed into the bottom surface 4125 of the LCU attachment area 4102. The depression 4121' serves to increase the total volume of the lateral adhesive cavity 4121 for receiving an optical bonding material, thereby enhancing the strength/integrity of the bond between the waveguide 4105 and the Y-groove 4110.

Figure 11:
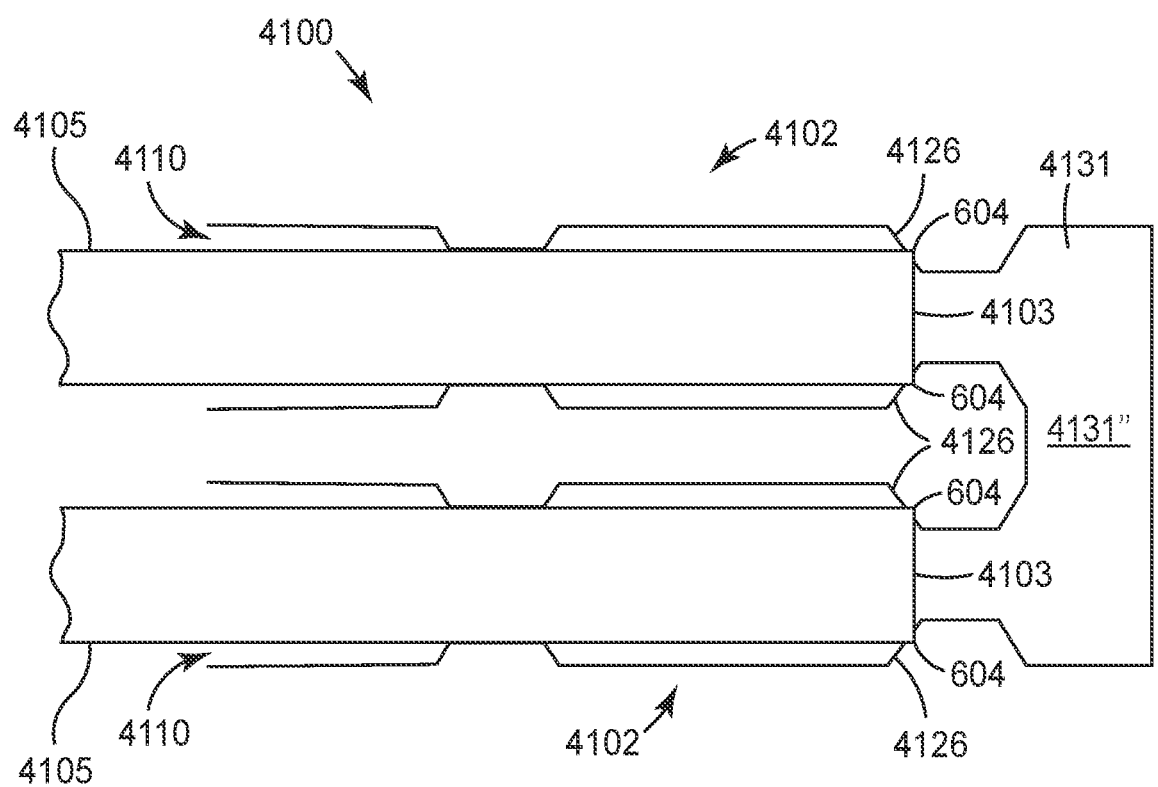
FIG. 11 is a top view of an optical ferrule attachment area comprising a shared forward adhesive reservoir in accordance with various embodiments.

FIG. 11 illustrates an LCU attachment area 4102 comprising a multiplicity of grooves 4110 each having a waveguide 4105 disposed therein. In FIG. 11, two grooves 4110 are illustrated with respective waveguides 4105 in contact with centering surfaces 4126 at a centered position within the grooves 4110 at the position of the waveguide stop 604. FIG. 11 shows an adhesive reservoir 4131" located adjacent the forward adhesive cavities 4131. The adhesive reservoir 4131" is a volume of the LCU attachment area 4102 that is shared between two or more of the forward adhesive cavities 4131. In this regard, the adhesive reservoir 4131" is fluidically coupled to two or more of the forward adhesive cavities 4131. The adhesive reservoir 4131" provides a volume for receiving additional bonding material near the terminal ends 4103 of the waveguides 4105, which increases the strength/integrity of the bond between the waveguide 4105 and the LCU attachment area 4102.

FIGS. 12-17 illustrate a process for installing a waveguide 4105 in a Y-groove 4110 of an LCU attachment area 4102 in accordance with various embodiments. In some embodiments, the installation process can be monitoring using microscopes with digital cameras to provide views (e.g., top view, side view) similar to those shown in FIGS. 12 and 13. The waveguide 4105 to be positioned within the Y-groove 4110 is shown extending from a buffer 4116 which encompasses the waveguide 4105. The buffer 4106 is typically a polymer sheath which serves to protect the waveguide 4105.

Figure 12:
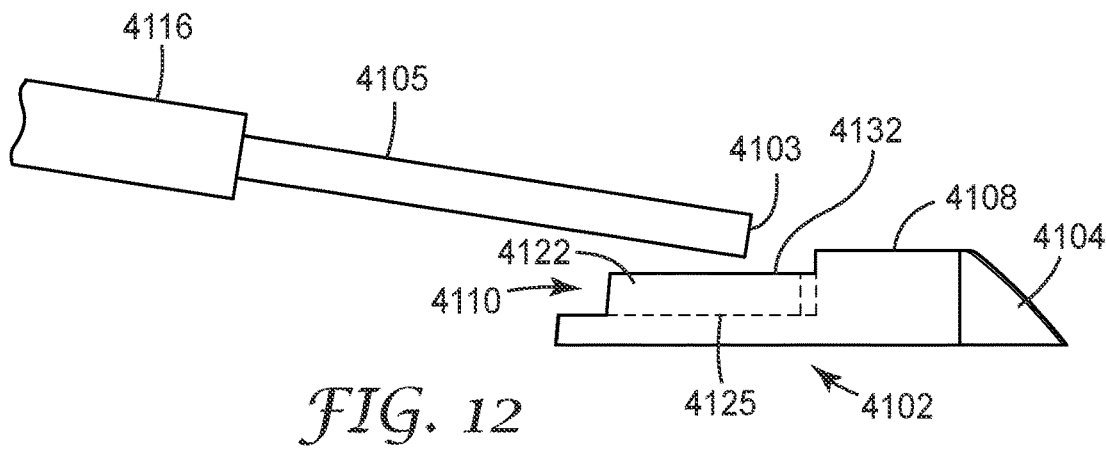
FIGS. 12-18 illustrate a process for installing a waveguide in a compound groove of an optical ferrule attachment area in accordance with various embodiments.
Figure 13:
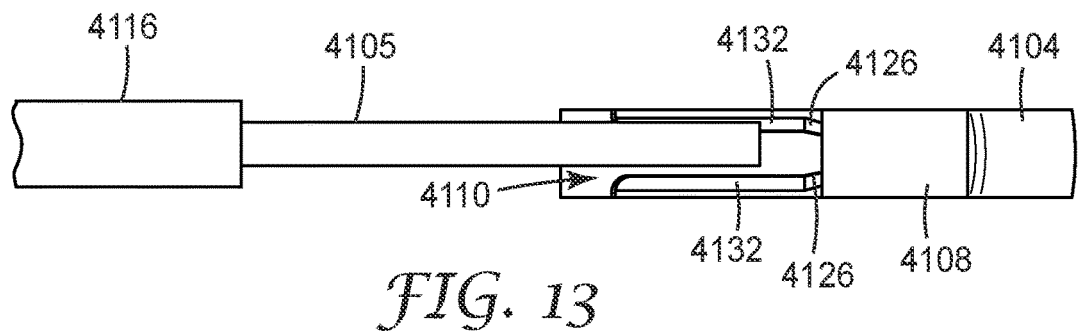
Figure 14:
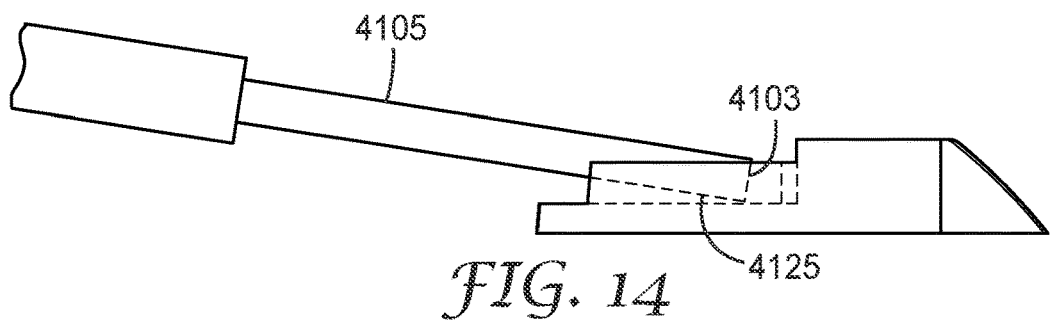
Figure 15:
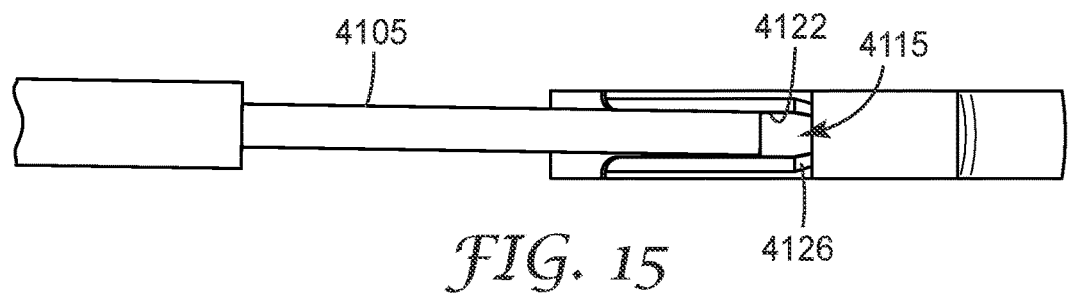

The waveguide 4105 is initially positioned over the expanded region (i.e., upper region) of Y-groove 4110 with the terminal end 4103 pointed downwards at a small angle (e.g., 5°-20°). FIGS. 12 and 13 illustrate a typical example in which the waveguide 4105 is initially misaligned within the Y-groove 4110. The upper expanded region of Y-groove 4110 includes angled side surfaces 4132 which serve to capture the waveguide 4105 and funnel the waveguide 4105 into the U-groove region (i.e., lower region) of the Y-groove 4110. As the terminal end 4103 of the waveguide 4105 is lowered, the terminal end 4103 contacts the capturing sidewall 4132 on one side of the Y-groove region, which guides the terminal end 4103 into the bottom region (i.e., U-groove region) of the Y-groove 4110, forcing the waveguide 4105 to bend and/or move laterally.

Figure 16:
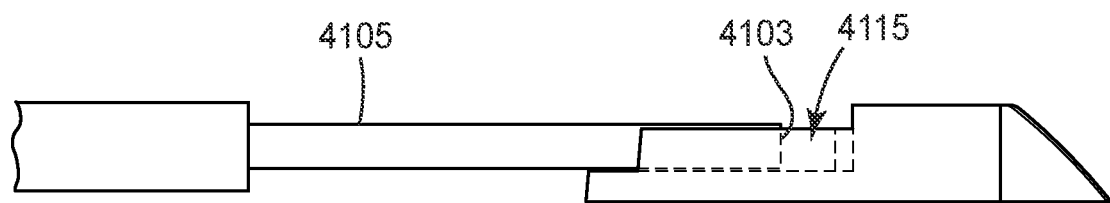
Figure 17:
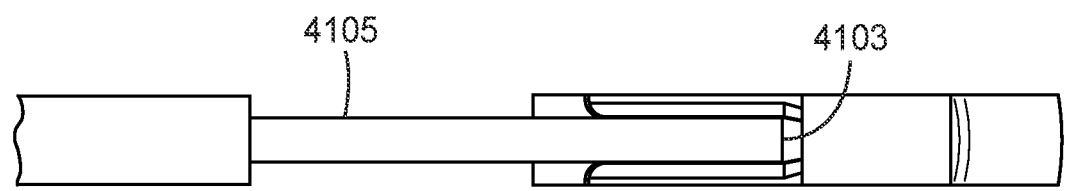
Figure 18:
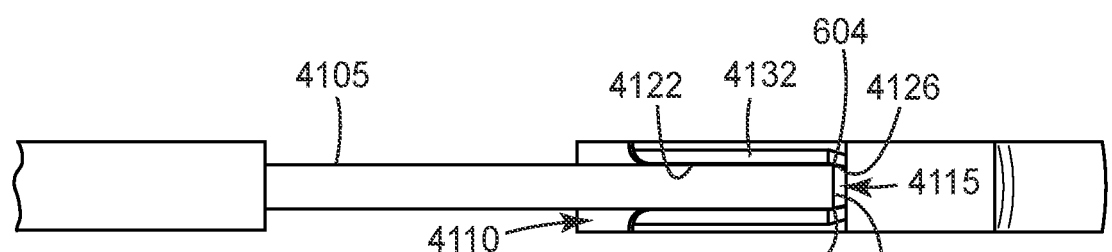

As the waveguide 4105 is lowered into the Y-groove 4110 (see FIG. 14), the terminal end 4103 is bent upward by the bottom surface 4125 of the Y-groove 4110. Simultaneously, the Y-groove 4110 continues to bend and/or move the waveguide 4105 laterally so that the waveguide 4105 is constrained by the near-vertical sidewalls 4122 of the U-groove region of the Y-groove 4110 (see FIG. 15). When the waveguide 4105 is approximately horizontal (i.e., tangent to the bottom surface 4125 of the Y-groove 4110), as is shown in FIG. 16, the waveguide 4105 is pushed forward into the longitudinal transition section 4115 of the Y-groove 4110 (see FIG. 17) until the terminal end 4103 contacts a centering surface 4126 (see FIG. 18). The centering surface 4126 pushes the terminal end 4103 of the waveguide 4105 laterally as needed until the terminal end 4103 is in contact with the centering surfaces 4126 on both sides of the Y-groove 4110 at the position of the waveguide stop 604, thereby precisely centering the terminal end 4103 of the waveguide 4105 in the Y-groove 4110, as is best seen in FIG. 18.

Figure 19:
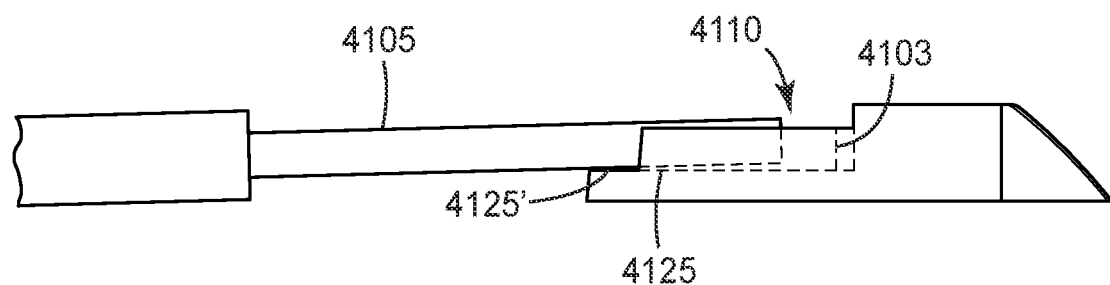
FIG. 19 illustrates an alignment error that can occur when installing a waveguide in a compound groove.

The final angle of the waveguide 4105 as it is centered by the centering surfaces 4126 is typically horizontal, and may be controlled by any suitable mechanical means, optionally guided by optical inspection of a side view, such as the view shown in FIG. 16. FIG. 19 illustrates an alignment error that can occur if the waveguide 4105 is lowered too much such that it makes contact with the rear edge 4125' of the bottom surface 4125 of the Y-groove 4110. In this scenario, the terminal end 4103 of the waveguide 4105 is levered up out of the Y-groove 4110. This misalignment is greatly reduced by recessing the most of the bottom surface 4125 of the Y-groove 4110, leaving only a relatively short porch region 4125" (FIG. 20) at the terminal end 4113 of the Y-groove 4110.

Figure 20:
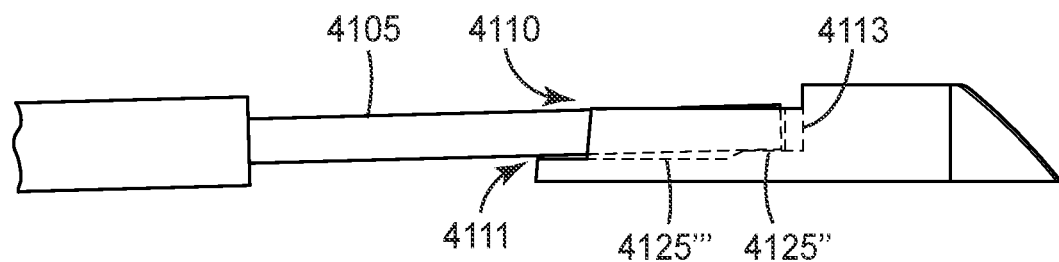
FIG. 20 shows a groove having a recessed bottom surface and a porch region according to various embodiments that facilitate reduction of the alignment error illustrated in FIG. 19.

As can be seen in FIG. 20, the majority of the bottom surface 4125''' is recessed relative to the porch region 4125" adjacent the terminal end 4113 of the Y-groove 4110. In some embodiments, the recessed section 4125''' of the bottom surface 4125 of the Y-groove 4110 can extend from the entrance 4111 of the Y-groove 4110 towards the terminal end 4113 and cover more than about one-half of the surface area of the bottom surface 4125. For example, the recessed section 4125''' can extend from the entrance 4111 of the Y-groove 4110 to within a distance from the terminal end 4113, the distance being less than about two times a height of the waveguide 4105 received by the Y-groove 4110. Typically, at least a portion of the recessed section 4125''' will be filled with cured optical adhesive, so that the waveguide 4105 is well supported.

A compound Y-groove 4110 comprising a lower U-groove and an expanded upper groove can be fabricated with injection molding of a thermoplastic (e.g., Ultem). Such materials have a much larger coefficient of thermal expansion than that of glass optical fibers. Therefore, there is concern over stresses caused by thermal excursions, such as may occur in operation in a computer chassis. These stresses may lead to optical misalignment due to warping of the part containing the Y-groove 4110, or even to failure of the adhesive used to bond the waveguide 4105. To minimize such stresses, it is desirable to minimize the length of the Y-groove 4110 that is filled with adhesive. However, sufficient groove length is required to constrain the angle of the waveguide 4105. The required length of the Y-groove 4110 depends on the angular tolerance of the optics system and on the extra width of the Y-groove 4110 included to provide clearance for the waveguide 4105.

Figure 21:
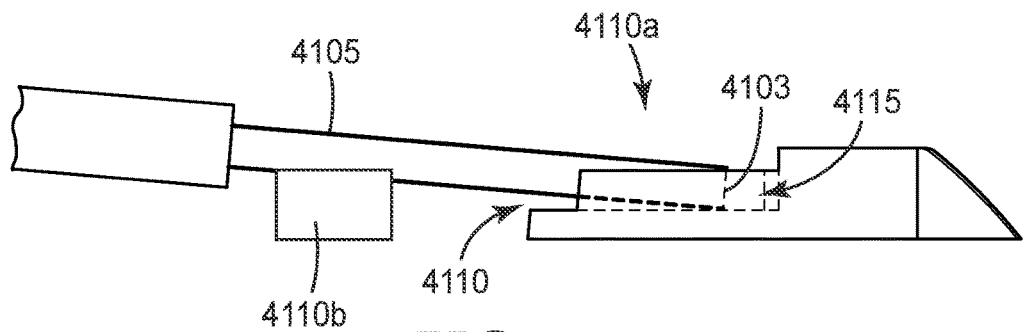
FIGS. 21 through 23 show a groove having two separate sections, including an angular alignment section and a longitudinal transition section comprising centering surfaces in accordance with various embodiments.
Figure 22:
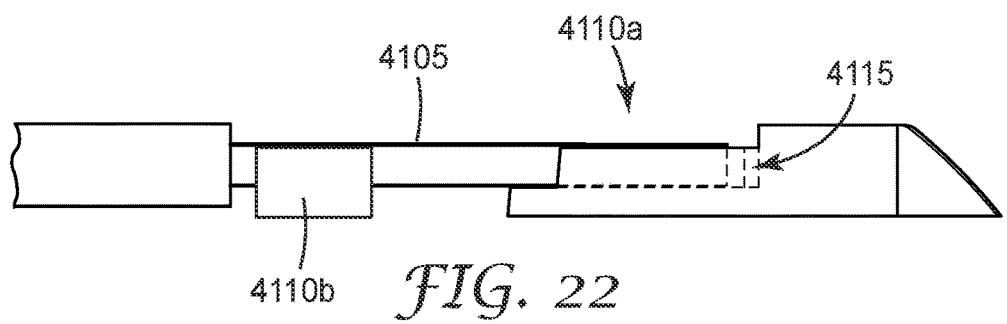
Figure 23:
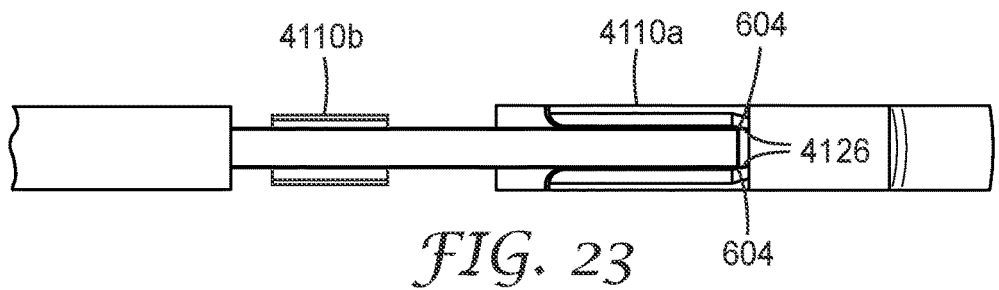

FIGS. 21-23 show a Y-groove 4110 with two separate sections 4110a and 4110b. Near the terminal end 4103 of the waveguide 4105, a short section includes the longitudinal transition section 4115 and the centering surfaces 4126. Further axial movement of the waveguide is restricted by the waveguide stop 604. The section 4110a may be filled with index-matching adhesive. A separate section 4110b is placed some sufficient distance (e.g., 0.5 mm) from the section 4110b, such that it provides accurate angular alignment of the waveguide 4105 but is not filled with adhesive. This design minimizes stresses associated with thermal expansion (by minimizing the bond length) without compromising angular alignment.

Figure 24:
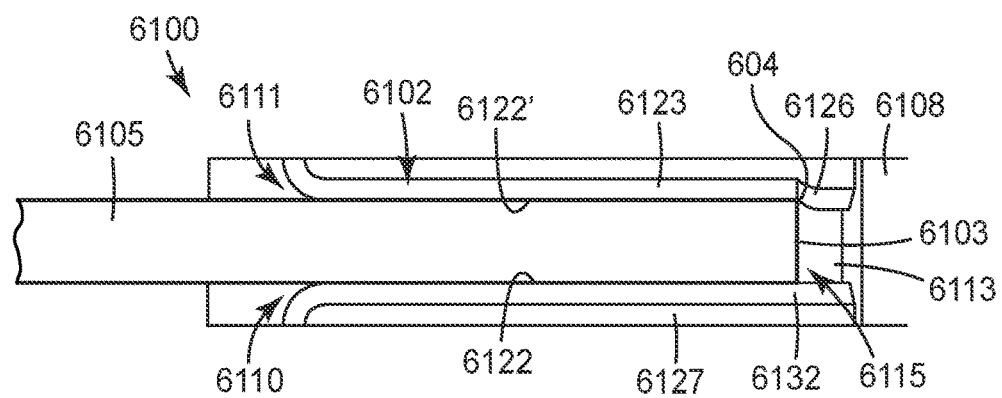
FIG. 24 shows an optical ferrule that incorporates a compound groove having a positioning arrangement in accordance with various embodiments.

FIG. 24 illustrates a portion of an LCU 6100 in accordance with various embodiments. The LCU 6100 shown in FIG. 24 includes a single LCU attachment area 6102. Although a single LCU attachment area 6102 is shown in FIG. 24, it is understood that a multiplicity of attachment areas 6102 can be provided on the LCU 6100 for receiving and permanently attaching to a multiplicity of optical waveguides. The LCU attachment area 6102 includes a groove 6110 having an entrance 6111 and a terminal end 6113. The groove 6110 is configured to receive an optical waveguide, such as the generally cylindrical waveguide 4105 shown in FIG. 5.

The LCU 6100 includes a light redirecting member (not shown in FIG. 24, but see 4104 in FIG. 4) and an intermediate section 6108 between the light redirecting member and the terminal end 6113. In some embodiments, the terminal end 6113 comprises an optically clear member, such as a lens, or is formed from optically transparent material. The intermediate section 6108 is formed from an optically transparent material. The light redirecting member includes an output side through which light exits from (or enters into) the light directing member.

According to some embodiments, the groove 6110 is a compound groove formed by a generally U-shaped lower portion 6123 and an expanded upper portion 6127, 6132 making the compound groove generally Y-shaped (Y-groove), as has been described in detail hereinabove. The groove 6110 includes a longitudinal transition section 6115 that includes a single centering sidewall 6126. Within the longitudinal transition section 6115, the spacing between sidewalls 6122 and 6122' reduces from a width equal to that of the optical waveguide 6105 plus a clearance to a width less than the width of the optical waveguide 6105. In the embodiment illustrated in FIG. 24, one of the sidewalls 6122 is substantially planar between the entrance 6111 and terminal end 6113 of the groove 6110. The opposing sidewall 6122' includes a sidewall portion that is substantially parallel to sidewall 6122 and transitions to the centering sidewall 6126 that angles inwardly in the transition section 6115. The centering sidewall 6126 may be considered chamfered sidewall of the groove 6110.

In FIG. 24, the groove 6110 includes a centering sidewall 6126 only on one side of the groove 6110. As such, the single centering sidewall 6126 may be considered a positioning sidewall 6126. During assembly, the optical waveguide 6105 is slid along the planar sidewall 6122 until the positioning sidewall 6126 pins the optical waveguide 6105 at the position of the waveguide stop 604 within the groove 6110, as is shown in FIG. 24. At this location, the positioning sidewall 6126 serves as the waveguide stop 604 and prevents further longitudinal advancement of the terminal end 6103 of the optical waveguide 6105 within the groove 6110. One advantage to the embodiment shown in FIG. 24 is that the angle of the optical waveguide 6105 can be well controlled during assembly, since it can be bent parallel to the sidewall 6122. In some embodiments, the positioning sidewall 6126 need not pinch the optical waveguide 6105, but can instead serve as a conventional stop, such as by defining the end of the groove 6110 or some other barrier, as long as the optical waveguide 6105 can be bent against the sidewall 6122 during assembly.

Additional information regarding ferrules, alignment frames, and connectors that may be used in conjunction with the approaches described herein is provided in the following commonly owned and concurrently filed U.S. Patent Applications which are incorporated herein by reference: U.S. Patent Application Ser. 62/239,998, having the title "Connector with Latching Mechanism"; U.S. Patent Application Ser. 62/240,069, having the title "Optical Ferrules"; U.S. Patent Application Ser. 62/240,066, having the title "Ferrules, Alignment Frames and Connectors,"; U.S. Patent Application Ser. 62/240,010, having the title "Optical Coupling Device with Waveguide Assisted Registration,"; U.S. Patent Application Ser. 62/240,008, having the title "Optical Cable Assembly with Retainer,"; U.S. Patent Application Ser. 62/240,000, having the title "Dust Mitigating Optical Connector,"; U.S. Patent Application Ser. 62/240,009, having the title "Optical Waveguide Registration Feature,"; U.S. Patent Application 62/239,996, having the title "Optical Ferrules and Optical Ferrule Molds,"; U.S. Patent Application 62/240,003, having the title "Configurable Modular Connectors,"; and U.S. Patent Application 62/240,005, having the title "Hybrid Connectors,".

Items described in this disclosure include:

Item 1. An optical ferrule comprising:
- at least one light affecting element configured to affect one or more characteristics of light from an optical waveguide as the light propagates in the optical ferrule, the light affecting element having an input surface;
- at least one receiving element configured to receive and secure the optical waveguide so that an output surface of the waveguide is optically coupled to the input surface of the light affecting element;
- a waveguide stop configured to limit movement of the waveguide toward the input surface of the light affecting element when the optical waveguide is installed in the receiving element; and
- a space between the output surface of the optical waveguide and the input surface of the light affecting element that is inaccessible to the optical waveguide when the optical waveguide is installed in the receiving element.

Item 2. The optical ferrule of item 1, wherein the receiving element comprises one or more grooves.

Item 3. The optical ferrule of item 1, wherein the receiving element comprises one or more holes.

Item 4. The optical ferrule of item 1, wherein the receiving element comprises at least one cylindrical hole.

Item 5. The optical ferrule of any of items 1 through 4, wherein the optical ferrule is a single optical fiber ferrule.

Item 6. The optical ferrule of any of items 1 through 4, wherein the optical ferrule is a multiple optical fiber ferrule.

Item 7. The optical ferrule of item 1, wherein the receiving element is a U shaped groove.

Item 8. The optical ferrule of item 7, wherein the waveguide stop comprises a position at which the width of the U shaped groove is less than a diameter of the waveguide.

Item 9. The optical ferrule of item 7, wherein the U shaped groove includes centering sidewalls configured to center the optical waveguide within the U shaped groove.

Item 10. The optical ferrule of item 7, wherein the U shaped groove includes at least one centering sidewall configured to position the optical waveguide within the U shaped groove.

Item 11. The optical ferrule of item 1, wherein the receiving element is a V shaped groove.

Item 12. The optical ferrule of item 1, wherein the receiving element is a Y shaped groove.

Item 13. The optical ferrule of item 12, wherein the waveguide stop comprises a position at which the width of the Y shaped groove is less than a diameter of the waveguide.

Item 14. The optical ferrule of item 12, wherein the Y shaped groove includes one or more centering sidewalls configured to position the optical waveguide within the Y shaped groove.

Item 15. The optical ferrule of item 12, wherein the Y shaped groove includes at least one centering sidewall configured to position the optical waveguide within the Y shaped groove.

Item 16. The optical ferrule of item 12, wherein a width between the centering sidewalls becomes progressively narrower along the longitudinal axis of the groove in a direction toward the input surface.

Item 17. The optical ferrule of item 16, wherein the waveguide stop comprises a position at which the width between the centering sidewalls is less than a diameter of the waveguide.

Item 18. The optical ferrule of any of items 1 through 17, wherein the waveguide stop comprises a wall.

Item 19. The optical ferrule of any of items 1 through 18, wherein the light affecting element comprises a lens.

Item 20. The optical ferrule of any of items 1 through 19, wherein the light affecting element comprises an element configured to redirect light from the optical waveguide.

Item 21. The optical ferrule of any of items 1 through 20, wherein the waveguide inaccessible space is configured to allow light to propagate unimpeded between an output surface of the waveguide and the input surface of the light affecting element.

Item 22. The optical ferrule of items 1 through 21, wherein the waveguide inaccessible space comprises an adhesive reservoir.

Item 23. The optical ferrule of any of items 1 through 22, wherein the waveguide inaccessible space is configured to contain a compliant material.

Item 24. The optical ferrule of item 23, wherein the compliant material is one or more of an optical adhesive, optical gel, and optical oil.

Item 25. The optical ferrule of any of items 1 through 24, wherein a distance between the output surface of the waveguide and the input surface of the light affecting element is greater than about 10 µm.

Item 26. The optical ferrule of any of items 1 through 24, wherein a distance between the output surface of the waveguide and the input surface of the light affecting element is greater than about 40 µm.

Item 27. The optical ferrule of an of items 1 through 24, wherein the waveguide stop is positioned such that a distance between the waveguide stop and the input surface of the light affecting element is greater than about 10 µm.

Item 28. The optical ferrule of any of items 1 through 24, wherein the waveguide stop is positioned such that a distance between the waveguide stop and the input surface of the light affecting element is greater than about 40 µm.

Item 29. The optical ferrule of any of items 1 through 28, wherein the optical waveguide is secured to the receiving element by an adhesive.

Item 30. The optical ferrule of item 29, wherein the adhesive is substantially transparent to the light from the optical waveguide.

Item 31. The optical ferrule of item 29, wherein the adhesive is also disposed in the inaccessible space.

Item 32. The optical ferrule of item 29, wherein an optically transparent material is disposed in the inaccessible space.

Item 33. The optical ferrule of item 32, wherein the optically transparent material is different from the adhesive.

Item 34. The optical ferrule of item 29, wherein the adhesive is not transparent to the light from the optical waveguide.

Item 35. An optical ferrule comprising:
at least one groove configured to receive and secure an optical waveguide;
at least one light affecting element configured to affect one or more characteristics of light from the optical waveguide as the light propagates in the optical ferrule, the light affecting element having an input surface proximate the groove;
a waveguide stop disposed in the groove proximate to the input surface of the light affecting element, the waveguide stop configured to restrict motion of the optical waveguide toward the input surface; and
a space between the input surface of the light affecting element and an output surface of the optical waveguide that is inaccessible to the optical waveguide when the optical waveguide is installed in the groove.

Item 36. The optical ferrule of item 35, wherein the groove comprises a U-, V-, or Y-shaped groove.

Item 37. The optical ferrule of any of items 35 through 36, wherein the groove includes centering sidewalls configured to center the optical waveguide within the groove.

Item 38. The optical ferrule of item 37, wherein the waveguide stop comprises a position at which a width between the centering sidewalls is less than a diameter of the waveguide.

Item 39. The optical ferrule of any of items 35 through 38, wherein the light affecting element comprises a lens.

Item 40. The optical ferrule of any of items 35 through 39, wherein the light affecting element comprises an element configured to redirect light from the optical waveguide.

Item 41. The optical ferrule of any of items 35 through 40, wherein the waveguide inaccessible space comprises an reservoir configured to contain a compliant material.

Item 42. The optical ferrule of any of items 35 through 41, wherein the waveguide inaccessible space, when filled with an adhesive, is configured to allow light to propagate substantially unimpeded between the output surface of the waveguide and the input surface of the light affecting element.

Item 43. The optical ferrule of any of items 35 through 42, wherein the waveguide stop is positioned such that a distance between the output surface of the waveguide and the input surface of the light affecting element is greater than about 10 μm.

Item 44. The optical ferrule of any of items 35 through 42, wherein the waveguide stop is positioned such that a distance between the output surface of the waveguide and the input surface of the light affecting element is greater than about 40 μm.

Item 45. The optical ferrule of any of items 35 through 42, wherein a distance between the waveguide stop and the input surface of the light affecting element is greater than about 10 μm.

Item 46. The optical ferrule of any of items 35 through 42, wherein a distance between the waveguide stop and the input surface of the light affecting element is greater than about 40 μm.

Item 47. The optical ferrule of any of items 35 through 46, wherein the groove includes sidewalls and a spacing between the sidewalls in a transition section decreases along the groove toward the input surface of the light affecting element.

Item 48. The optical ferrule of item 47, wherein the transition section comprises substantially planar sidewalls.

Item 49. The optical ferrule of item 47, wherein the transition section comprises non-planar sidewalls.

Item 50. The optical ferrule of item 47, wherein an output surface of the optical waveguide contacts the sidewalls of the transition section at the waveguide stop.

Item 51. The optical ferrule of item 47 wherein contact between cladding of the optical waveguide and the sidewalls of the transition section guides the optical waveguide laterally to a central plane of the groove.

Item 52. The optical ferrule of any of items 35 through 51, where the waveguide is a single-mode or multimode optical fiber.

Item 53. The optical ferrule of any of items 35 through 52, wherein a bottom surface of each groove comprises at least one recessed section.

Item 54. The optical ferrule of item 53, wherein a majority of the bottom surface includes the recessed section.

Item 55. The optical ferrule of item 35, wherein the waveguide includes a protruding feature that engages with the waveguide stop to restrict motion of the optical waveguide toward the input surface.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

Various modifications and alterations of the embodiments discussed above will be apparent to those skilled in the art, and it should be understood that this disclosure is not limited to the illustrative embodiments set forth herein. The reader should assume that features of one disclosed embodiment can also be applied to all other disclosed embodiments unless otherwise indicated. It should also be understood that all U.S. patents, patent applications, patent application publications, and other patent and non-patent documents referred to herein are incorporated by reference, to the extent they do not contradict the foregoing disclosure.

The invention claimed is:
1. An optical ferrule comprising:
at least one light affecting element configured to affect one or more characteristics of light from an optical waveguide as the light propagates in the optical ferrule, the light affecting element having an input surface;
at least one receiving element configured to receive and secure the optical waveguide so that an output surface of the waveguide is optically coupled to the input surface of the light affecting element, the receiving element configured to surround an end portion of the optical waveguide;

a waveguide stop configured to limit movement of the waveguide toward the input surface of the light affecting element when the optical waveguide is installed in the receiving element; and a space between the output surface of the optical waveguide and the input surface of the light affecting element that is inaccessible to the optical waveguide when the optical waveguide is installed in the receiving element, wherein a unitary body comprises the light affecting element, the receiving element, and the waveguide stop, the receiving element comprising one or more holes in the unitary body configured to receive the optical waveguide, the receiving element comprising an access port in the unitary body disposed between the output surface of the optical waveguide and the input surface of the light affecting element and configured so that material can be placed in the waveguide inaccessible space through the access port, wherein the waveguide inaccessible space forms a reservoir bounded along an axial direction of the optical waveguide by the output surface of the optical waveguide and the input surface of the light affecting element, and in at least one cross-section of the reservoir in a plane orthogonal to the axial direction and disposed between the output surface of the optical waveguide and the access port, the reservoir is entirely encircled by a sidewall of the hole receiving the optical waveguide.

2. The optical ferrule of claim 1, wherein the optical waveguide includes a protruding feature that engages with the waveguide stop to restrict motion of the optical waveguide toward the input surface, the protruding feature spaced apart from output surface of the optical waveguide along the axial direction of the optical waveguide and protruding laterally from a side of the optical waveguide.

3. The optical ferrule of claim 1, wherein the one or more holes comprise at least one cylindrical hole.

4. The optical ferrule of claim 1, wherein the optical ferrule is a single optical fiber ferrule.

5. The optical ferrule of claim 1, wherein the optical ferrule is a multiple optical fiber ferrule.

6. The optical ferrule of claim 1, wherein the waveguide inaccessible space is configured to allow light to propagate unimpeded between the output surface of the waveguide and the input surface of the light affecting element.

7. The optical ferrule of claim 1, wherein a distance between the output surface of the waveguide and the input surface of the light affecting element is greater than about 10 µm.

8. The optical ferrule of claim 1, wherein the optical waveguide is secured to the receiving element by an adhesive.

9. The optical ferrule of claim 8, wherein the adhesive is also disposed in the waveguide inaccessible space.

10. The optical ferrule of claim 8, wherein an optically transparent material is disposed in the waveguide inaccessible space, the optically transparent material and the adhesive having different compositions.

11. The optical ferrule of claim 10, wherein the optically transparent material is an optical oil.

12. The optical ferrule of claim 10, wherein the optically transparent material is a compliant optical gel.

* * * * *